(12) United States Patent
Song et al.

(10) Patent No.: US 10,952,267 B2
(45) Date of Patent: Mar. 16, 2021

(54) TERMINAL AND METHOD FOR CONNECTING TO TARGET DEVICES

(71) Applicant: LG ELECTRONICS INC., Seoul (KR)

(72) Inventors: Taeyoung Song, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/543,191

(22) Filed: Aug. 16, 2019

(65) Prior Publication Data
US 2019/0380161 A1 Dec. 12, 2019

(30) Foreign Application Priority Data

Oct. 31, 2018 (KR) .................. 10-2018-0132281

(51) Int. Cl.
| | |
|---|---|
| H04M 1/72 | (2006.01) |
| H04W 76/14 | (2018.01) |
| H04W 48/08 | (2009.01) |
| H04W 4/16 | (2009.01) |
| H04L 9/00 | (2006.01) |
| G06N 20/00 | (2019.01) |

(52) U.S. Cl.
CPC ............ *H04W 76/14* (2018.02); *G06N 20/00* (2019.01); *H04W 48/08* (2013.01)

(58) Field of Classification Search
None
See application file for complete search history.

(56) References Cited

U.S. PATENT DOCUMENTS

| | | | | |
|---|---|---|---|---|
| 8,438,288 | B2 * | 5/2013 | Garcia Jurado Suarez | ................ H04L 9/3073 709/227 |
| 8,854,429 | B2 * | 10/2014 | Seo | ...................... H04N 13/341 348/43 |
| 8,879,994 | B2 * | 11/2014 | Brown | ............... H04N 1/00347 455/41.3 |
| 9,055,162 | B2 * | 6/2015 | Park | ..................... G06F 3/0346 |

(Continued)

FOREIGN PATENT DOCUMENTS

| | | |
|---|---|---|
| KR | 1020100088706 | 8/2010 |
| KR | 1020110136096 | 12/2011 |

(Continued)

OTHER PUBLICATIONS

Korean Intellectual Property Office Application No. 10-2018-0132281, Office Action dated Jan. 23, 2020, 6 pages.

(Continued)

*Primary Examiner* — Tuan A Tran
(74) *Attorney, Agent, or Firm* — Lee, Hong, Degerman, Kang & Waimey PC

(57) ABSTRACT

A terminal of the present disclosure includes a communicator configured to communicate using a short-range wireless protocol, a camera, and one or more processors configured to receive advertisement information from a plurality of target devices, control the camera to photograph an image of a selected target device of the plurality of target devices, and establish a connection with the selected target device via the communicator based on the photographed image of the selected target device and the received advertisement information.

14 Claims, 30 Drawing Sheets

(56) References Cited

U.S. PATENT DOCUMENTS

| | | | |
|---|---|---|---|
| 9,066,326 B2* | 6/2015 | Narayan | H04W 12/06 |
| 9,122,438 B2* | 9/2015 | Okigami | H04M 1/7253 |
| 9,277,391 B2* | 3/2016 | Wan | H04W 8/005 |
| 9,363,354 B2* | 6/2016 | Lee | H04N 21/4126 |
| 9,467,802 B2* | 10/2016 | Brown | H04N 1/00347 |
| 9,699,281 B2* | 7/2017 | Fisher | H04N 5/23218 |
| 9,742,763 B2* | 8/2017 | Neuman | H04L 63/0876 |
| 9,781,303 B2* | 10/2017 | Ohata | H04N 1/00204 |
| 9,872,325 B2* | 1/2018 | Lee | H04N 21/4223 |
| 9,922,273 B2* | 3/2018 | Lim | H04M 1/2755 |
| 10,136,460 B2* | 11/2018 | Ko | H04N 21/4223 |
| 10,218,834 B2* | 2/2019 | Ham | H04M 1/725 |
| 10,241,737 B2* | 3/2019 | Choi | G06F 3/016 |
| 10,375,749 B2* | 8/2019 | Ko | H04W 4/21 |
| 2010/0031347 A1 | 2/2010 | Ohto | |
| 2011/0016405 A1* | 1/2011 | Grob | H04N 7/185 715/740 |
| 2011/0263202 A1* | 10/2011 | Lee | H04M 1/7253 455/41.2 |
| 2012/0120266 A1* | 5/2012 | Kang | H04N 5/23293 348/211.2 |
| 2012/0178369 A1 | 7/2012 | Kim | |
| 2012/0287290 A1* | 11/2012 | Jain | H04L 63/18 348/207.1 |
| 2013/0297839 A1* | 11/2013 | Chai | G06F 13/385 710/62 |
| 2014/0013100 A1* | 1/2014 | Menzel | H04N 21/43637 713/150 |
| 2014/0149872 A1* | 5/2014 | Komori | H04L 67/141 715/736 |
| 2014/0197232 A1* | 7/2014 | Birkler | H04L 63/08 235/375 |
| 2014/0327786 A1* | 11/2014 | Grob | H04N 1/0044 348/207.1 |
| 2015/0215778 A1* | 7/2015 | Chin | H04W 12/0608 455/411 |
| 2016/0037573 A1* | 2/2016 | Ko | G06K 9/00671 455/41.2 |
| 2016/0149905 A1* | 5/2016 | Wang | G06K 9/00281 455/41.2 |
| 2016/0180845 A1* | 6/2016 | Kim | G06F 3/167 348/211.2 |
| 2018/0124552 A1 | 5/2018 | Cho et al. | |
| 2019/0327775 A1 | 10/2019 | Ko et al. | |

FOREIGN PATENT DOCUMENTS

| | | |
|---|---|---|
| KR | 10-2012-0053147 | 5/2012 |
| KR | 1020160014513 | 2/2016 |
| KR | 101789690 | 10/2017 |
| KR | 10-2018-0046462 | 5/2018 |

OTHER PUBLICATIONS

PCT International Application No. PCT/KR2019/011339, Written Opinion of the International Searching Authority dated Dec. 23, 2019, 8 pages.

Korean Intellectual Property Office Application No. 10-2018-0132281, Notice of Allowance dated Jun. 24, 2020, 6 pages.

* cited by examiner

FIG. 8
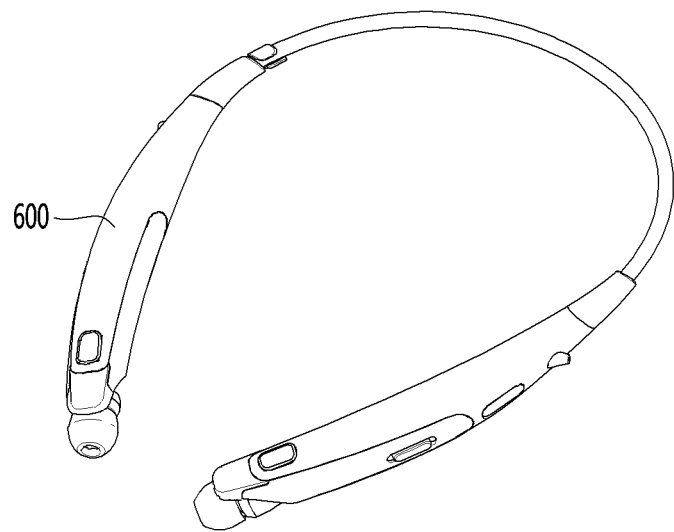
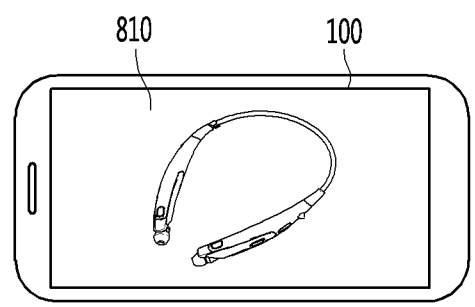

FIG. 9
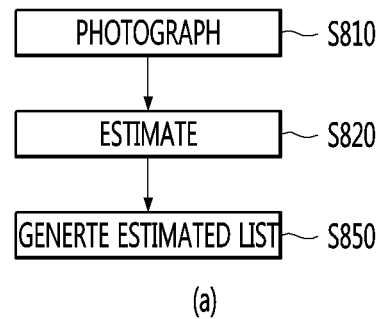
(a)
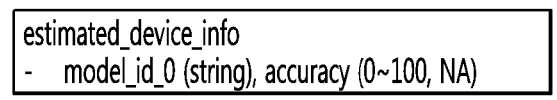
(b)
FIG. 10
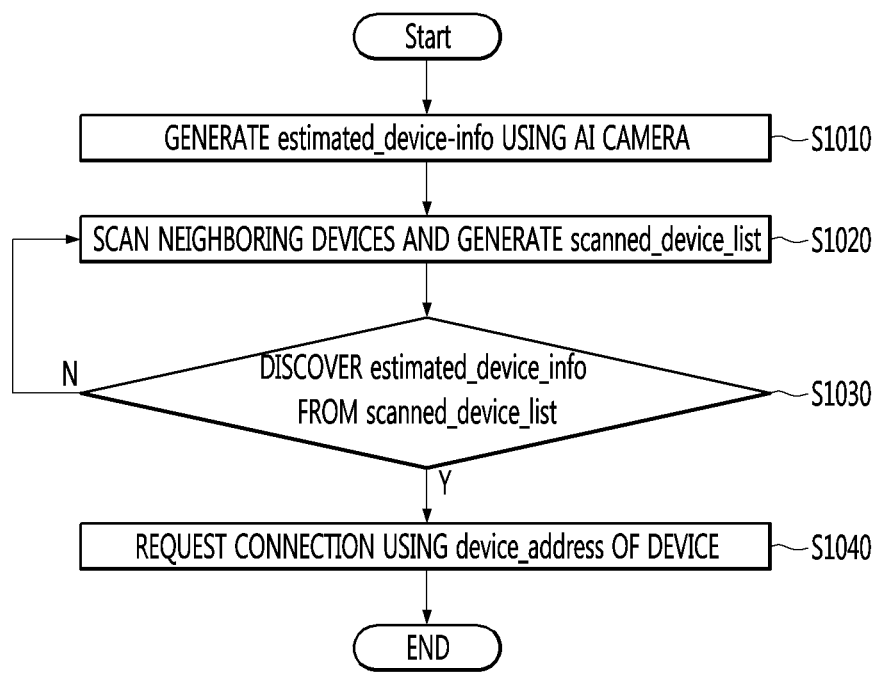

FIG. 11
<a>
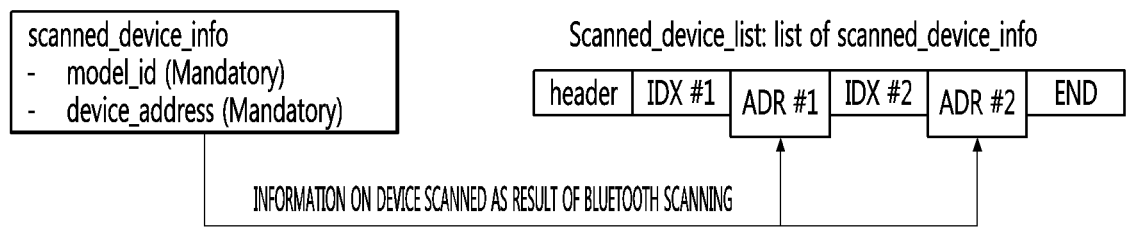
<b>
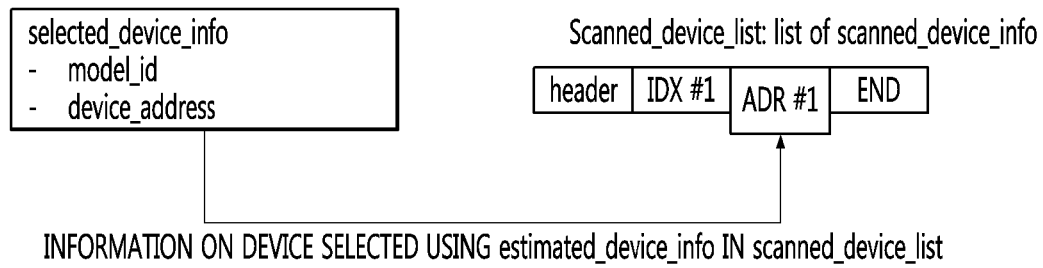
INFORMATION ON DEVICE SELECTED USING estimated_device_info IN scanned_device_list
<c>

FIG. 16B
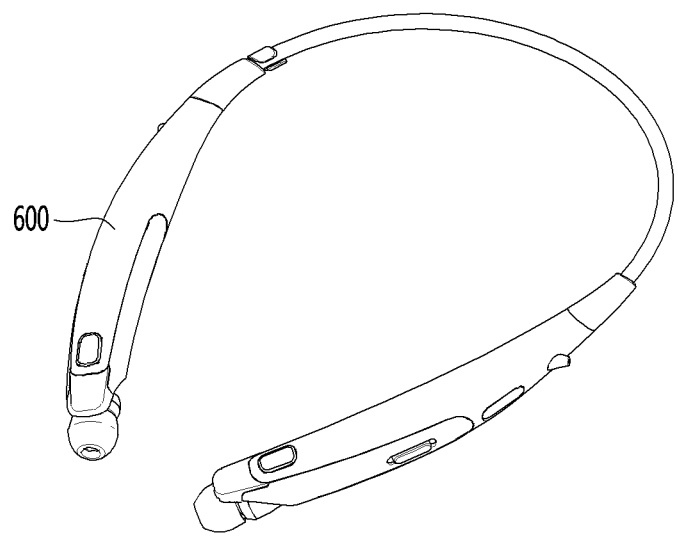
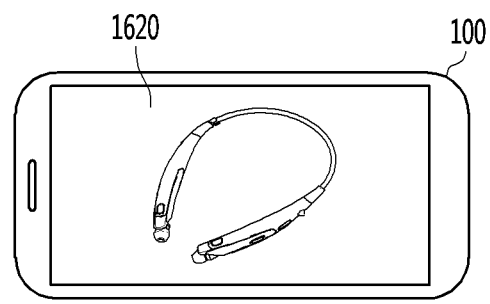

FIG. 17
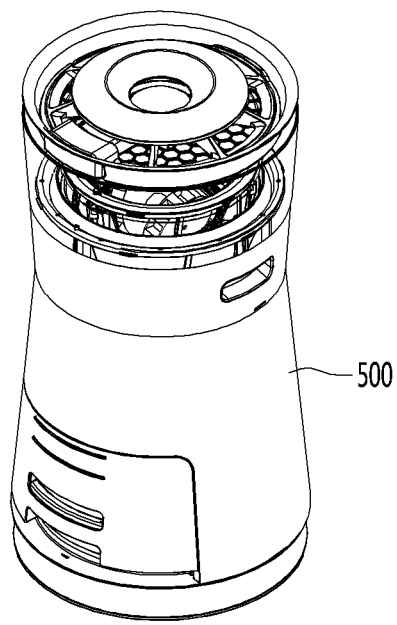
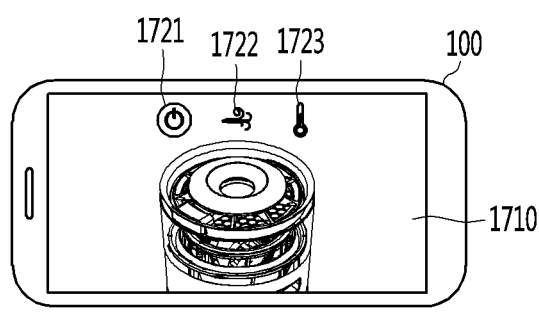

FIG. 18A
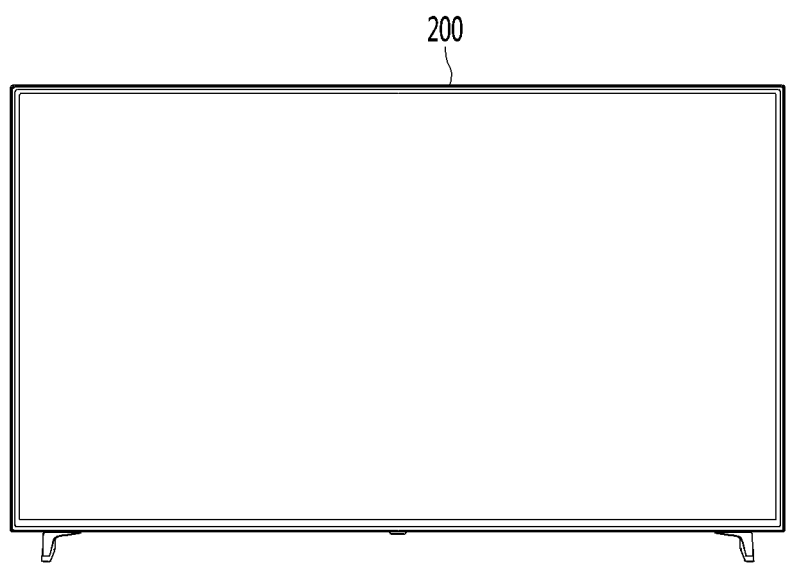
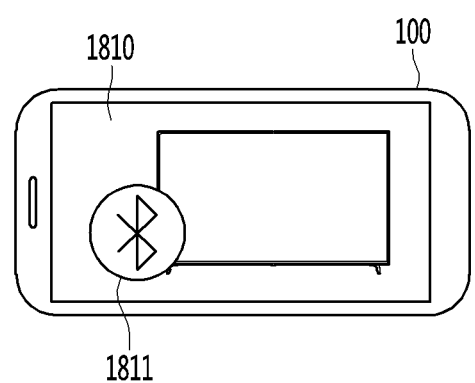

FIG. 23
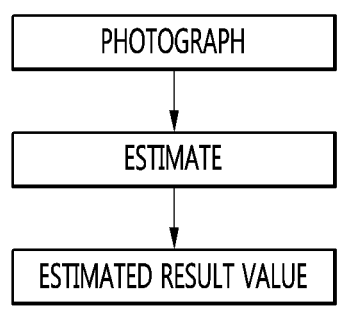
(a)
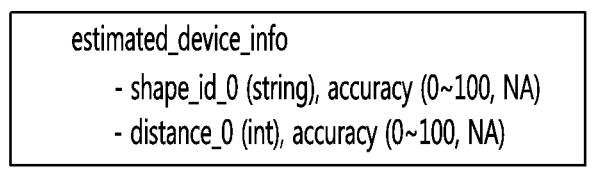
(b)
FIG. 24
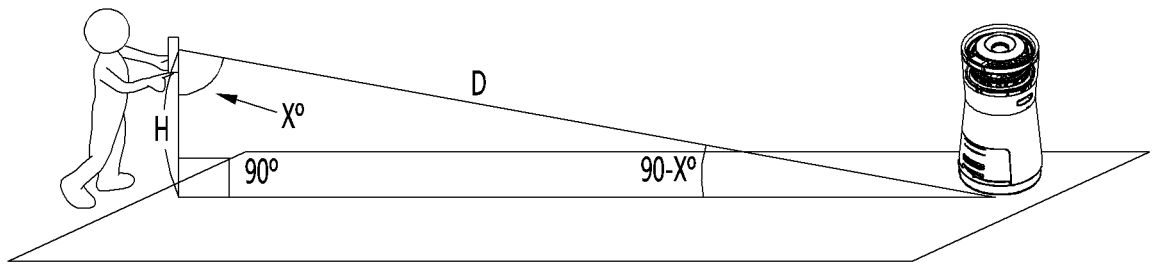

| Shape ID | Model ID | connection | service_type | tx_power |
|---|---|---|---|---|
| 0x01 | P5570 | BT | Speaker | 0dBm |
| 0x01 | L220 | BT/WiFi | Purifier | -20dBm |
| 0x02 | M7780 | BT/WiFi | TV | 0dBm |
| 0x02 | L7786 | BT/WiFi | Monitor | -20dBm |
| 0x03 | LAS5780 | BT/WiFi | Washer | 0dBm |
| 0x03 | LP430 | BT/WiFi | Dryer | 0dBm |
| 0x04 | AA5786 | BT/WiFi | Styler | 0dBm |
| 0x04 | BC9876 | BT/WiFi | Refrigerator | 20dBm |
| 0x05 | CC9987 | BT | Cooler | 0dBm |
| ... | ... | ... | ... | ... |

FIG. 26

| Model ID | Shape ID | connection | service_type |
|---|---|---|---|
| P5570 | 0x01 | BT | Speaker |
| L220 | 0x01 | BT/WiFi | Purifier |
| M7780 | 0x02 | BT/WiFi | TV |
| L7786 | 0x02 | BT/WiFi | Monitor |

FIG. 27

| Shape ID | Model ID | device_address | distance |
|---|---|---|---|
| 0x01 | PP5570 | 12:AB:11:22:33:44 | 1m |
| 0x01 | L220 | 22:AB:11:22:33:44 | 2m |
| 0x02 | M7780 | 33:AB:11:22:33:44 | 3m |

FIG. 29

| Shape ID | Model ID | connection | service_type | tx_power | |
|---|---|---|---|---|---|
| 0x01 | P5570 | BT | Speaker | 0dBm | —2910 |
| 0x01 | L220 | BT/WiFi | Purifier | -20dBm | —2920 |
| 0x02 | M7780 | BT/WiFi | TV | 0dBm | —2930 |
| 0x02 | L7786 | BT/WiFi | Monitor | -20dBm | —2940 |
| 0x03 | LAS5780 | BT/WiFi | Washer | 0dBm | |
| 0x03 | LP430 | BT/WiFi | Dryer | 0dBm | |
| 0x04 | AA5786 | BT/WiFi | Styler | 0dBm | |
| 0x04 | BC9876 | BT/WiFi | Refrigerator | 20dBm | |
| 0x05 | CC9987 | BT | Cooler | 0dBm | |
| ... | ... | ... | ... | ... | |

FIG. 30

| Shape ID | Model ID | connection | service_type | tx_power | |
|---|---|---|---|---|---|
| 0x01 | P5570 | BT | Speaker | 0dBm | —2910 |
| 0x01 | L220 | BT/WiFi | Purifier | -20dBm | —2920 |

FIG. 31

| Shape ID | Model ID | connection | service_type | tx_power | |
|---|---|---|---|---|---|
| 0x01 | P5570 | BT | Speaker | 0dBm | —2910 |

TERMINAL AND METHOD FOR CONNECTING TO TARGET DEVICES

CROSS-REFERENCE TO RELATED APPLICATIONS

Pursuant to 35 U.S.C. § 119(a), this application claims the benefit of earlier filing date and right of priority to Korean Patent Application No. 10-2018-0132281, filed on Oct. 31, 2018, the contents of which are all hereby incorporated by reference herein in its entirety.

BACKGROUND

The present disclosure relates to a terminal capable of photographing a target device to be connected to establish a short-range wireless communication connection, such as BLUETOOTH low energy (BLE) connection, with the target device.

BLUETOOTH is a short-range wireless technology standard for wirelessly connecting various devices to exchange data over short distances. In order to perform wireless communication between two devices using BLUETOOTH communication, a user performs a procedure of discovering BLUETOOTH devices for communication and requesting a connection. In the present invention, the device may mean equipment or an apparatus.

At this time, the user may discover and then connect the BLUETOOTH devices according to a BLUETOOTH communication method.

The BLUETOOTH communication method includes a basic rate/enhanced data rate (BR/EDR) method and a low energy (LE) method. BR/EDR may also be referred to as BLUETOOTH Classic. The BLUETOOTH classic method includes BLUETOOTH technology which has been used since BLUETOOTH version number 1.0 using a basic rate and BLUETOOTH technology using an enhanced data rate which has been supported since BLUETOOTH version number 2.0.

BLUETOOTH low energy (hereinafter, referred to as BLUETOOTH LE) technology has been applied since BLUETOOTH version number 4.0 and may stably provide information of several hundred kilobytes (kB) with low power consumption. Such BLUETOOTH LE technology uses an attribute protocol to enable information exchange between devices. Such BLUETOOTH LE technology may reduce header overhead and simplify operation, thereby reducing energy consumption.

Some BLUETOOTH devices may not include a display or a user interface. Complexity of connection/management/control/disconnection between various types of BLUETOOTH devices and, more particularly, BLUETOOTH devices using similar technologies is increasing.

In addition, BLUETOOTH has a relatively high data rate with relatively low power and low cost, but a transmission distance is typically limited to a maximum of 100 m. Therefore, BLUETOOTH is most suitable for use in confined spaces and across relatively short-range distances.

Meanwhile, if a terminal and another device are to be connected using a conventional BLUETOOTH LE method, many processes or operations have to be performed for pairing and connection.

For example, the user must initiate a scan after entering a BLUETOOTH menu, confirm and select a device to be connected in a list of numerous scanned and discovered devices, and initiate a connection to establish a pairing and connection. Only after the connection is established following the numerous connection operations, the user is then able to execute a dedicated application ("app") to control the selected device.

SUMMARY

An object of the present disclosure is to provide a terminal capable of photographing a target device to be connected to establish a BLUETOOTH low energy (BLE) connection with the target device.

To achieve the above object, there is provided a terminal including a communicator configured to communicate using a BLUETOOTH low energy (BLE) protocol, a camera, and one or more processors configured to receive advertisement information from a plurality of target devices, control the camera to photograph an image of a selected target device of the plurality of target devices, and establish a connection with the selected target device via the communicator based on the photographed image of the selected target device and the received advertisement information. The advertisement information from the plurality of target devices may include information of the device themselves to assist in determining which device has been selected by the user, including shape information, model information, positional distance information of the device, and the like.

BRIEF DESCRIPTION OF THE DRAWINGS

FIG. 8 is a diagram showing a state in which a target device is photographed by a terminal.

FIG. 9 is a diagram illustrating a method of generating a list of identification information estimated using a photographed image according to an embodiment of the present invention.

FIGS. 10 and 11 are diagrams illustrating a method of selecting a target device for connection and control using estimated identification information and identification information of a plurality of target devices acquired by scanning, according to an embodiment of the present invention.

FIGS. 16A, 16B, and 16C are diagrams showing a process of establishing connection with a first target device according to an embodiment of the present invention.

FIG. 17 is a diagram showing a control icon corresponding to the function of a target device according to an embodiment of the present invention.

FIGS. 18A, 18B, and 18C are diagrams illustrating a method of inputting a voice command using a terminal according to an embodiment of the present invention.

FIG. 23 is a diagram showing a method of estimating shape information using a photographed image according to an embodiment of the present invention.

FIG. 24 is a diagram illustrating an example of a method of acquiring a distance from a target device according to an embodiment of the present invention.

FIG. 25 is a diagram showing a list of detailed information according to an embodiment of the present invention.

FIG. 26 is a diagram illustrating advertisement information including only shape information.

FIG. 27 is a diagram showing a list of advertisement information received from three target devices according to an embodiment of the present invention.

FIG. 29 is a diagram showing a detailed information list according to an embodiment of the present invention.

FIGS. 30 and 31 are diagrams showing a list of searched detailed information.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element may be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
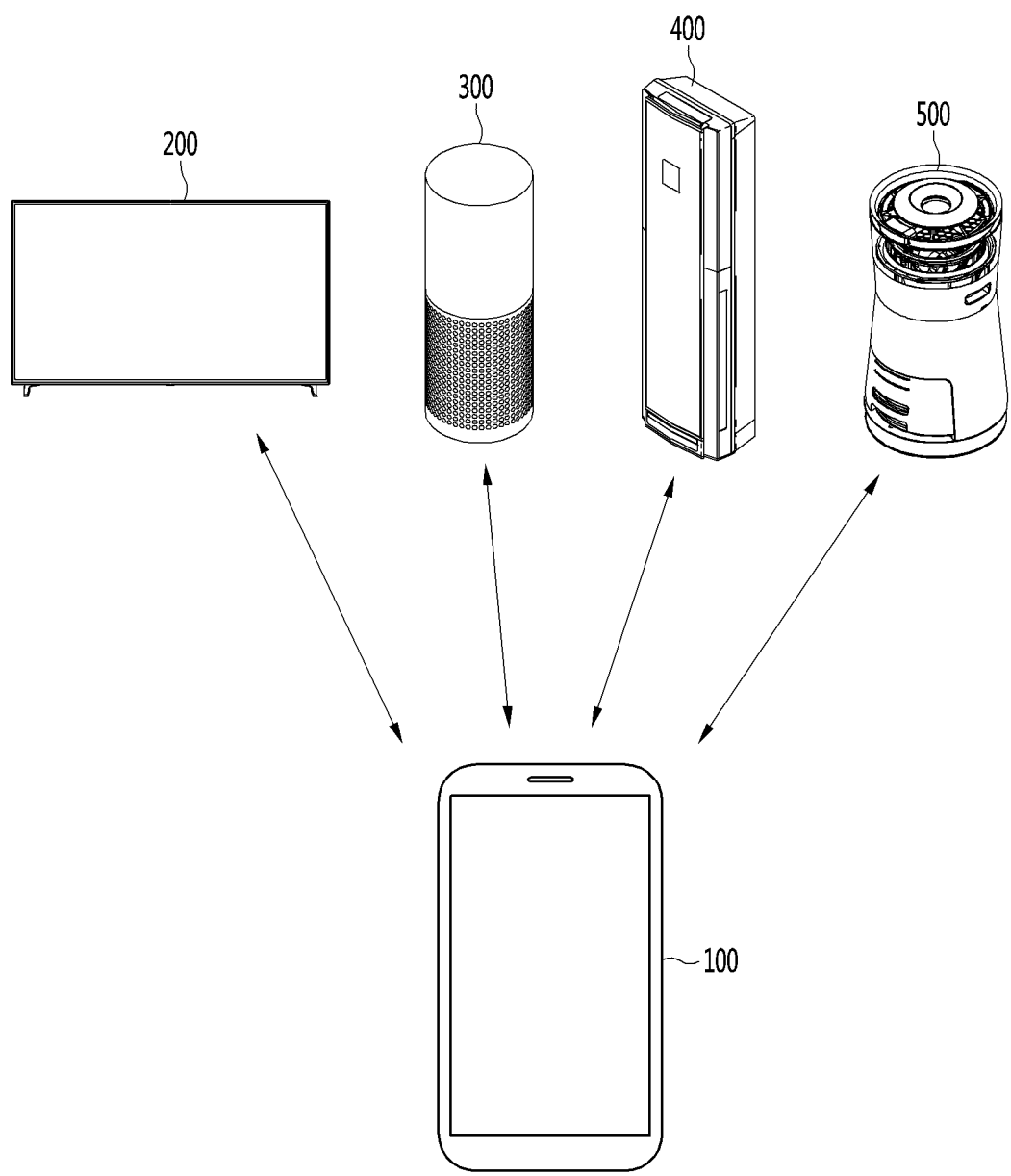
FIG. 1 shows an example of a wireless communication system using BLUETOOTH low energy technology according to an embodiment of the present invention.

FIG. 1 is a schematic diagram showing an example of a wireless communication system using BLUETOOTH low energy technology according to an embodiment of the present invention.

The wireless communication system may include a terminal 100 and a plurality of target devices 200, 300, 400 and 500.

The terminal 100 and the plurality of target devices 200, 300, 400 and 500 may perform BLUETOOTH communication using BLUETOOTH low energy (BLE) (hereinafter, referred to as BLE) technology.

BLE technology has a relatively smaller duty cycle as compared to BLUETOOTH basic rate/enhanced data rate (BR/EDR) technology, enables low-cost production and significantly reduces power consumption through a low data transfer rate. Due to such reduction in power consumption, some devices utilizing BLE may operate on only a coin cell battery for more than one year.

In addition, BLE technology simplifies a procedure of connecting devices and has a smaller packet size than BLUETOOTH BR/EDR technology.

In BLE technology, (1) the number of radio frequency (RF) channels is 40, (2) a data transfer rate of 1 Mbps is supported, (3) topology has a scatternet structure, (4) latency is 3 ms, (5) maximum current is 15 mA or less, (6) output power is 10 mW (10 dBm) or less, and (7) the BLE technology is mainly used in applications such as mobile phones, watches, sports, health care, sensors, and device control.

Meanwhile, the terminal 100 may operate as a client device of the plurality of target devices. In addition, the terminal may be represented by a master device, a master, a client, a member, a sensor device, a sink device, a collector, a first device, a handsfree device, and the like.

In addition, the plurality of target devices 200, 300, 400 and 500 may operate as a server device of the terminal 100. In addition, the plurality of target devices may be represented by a data service device, a slave device, a slave, a server, a conductor, a host device, a gateway, a sensing device, a monitoring device, a second device, an audio gate (AG), and the like.

The plurality of target devices refers to devices for providing data to the terminal through a response upon receiving a data request from the terminal, by receiving data from the terminal and directly performing communication with the terminal.

In addition, the plurality of target devices sends a notification message and an indication message to the terminal in order to provide data information to the terminal. In addition, the plurality of target devices receives a confirmation message corresponding to the indication message from the terminal after transmitting the indication message to the terminal.

In addition, the plurality of target devices may provide data information to a user through a display unit or receive a request from the user through a user input interface, during a process of transmitting and receiving notification, indication, and confirmation messages to and from the client device.

In addition, the plurality of target devices may read data from a memory unit and write new data in the memory unit, during a process of transmitting and receiving a message to and from the terminal.

The terminal generally refers to a device for requesting data information and data transmission from the plurality of target devices.

The terminal receives data from the plurality of target devices through the notification message, the indication message, etc., and transmits a confirmation message in response to the indication message upon receiving the indication message from the plurality of target devices.

The terminal may provide information to the user through an output unit and receive user input through an input unit, during a process of transmitting and receiving messages to and from the plurality of target devices.

In addition, the terminal may read data from a memory unit and write new data in the memory unit, in a process of transmitting and receiving messages to and from the plurality of target devices.

FIGS. 2A-2D are diagrams illustrating problems which may occur upon BLE connection.

Figure 2A:
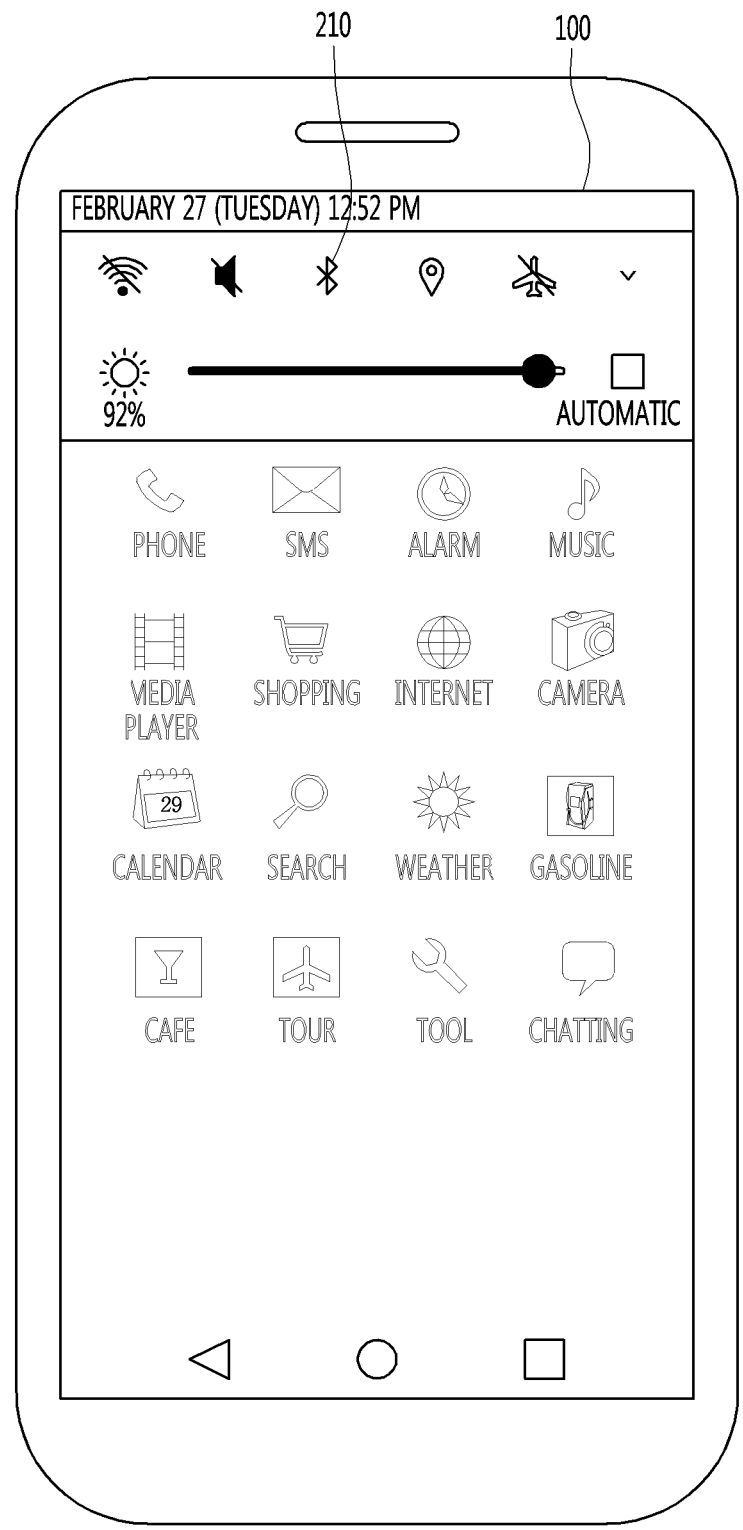
FIGS. 2A, 2B, 2C, and 2D are diagrams illustrating examples of a BLE connection.

Referring to FIG. 2A, in one example a user selects a BLUETOOTH icon 210 to enter a BLUETOOTH connection menu.

Figure 2B:
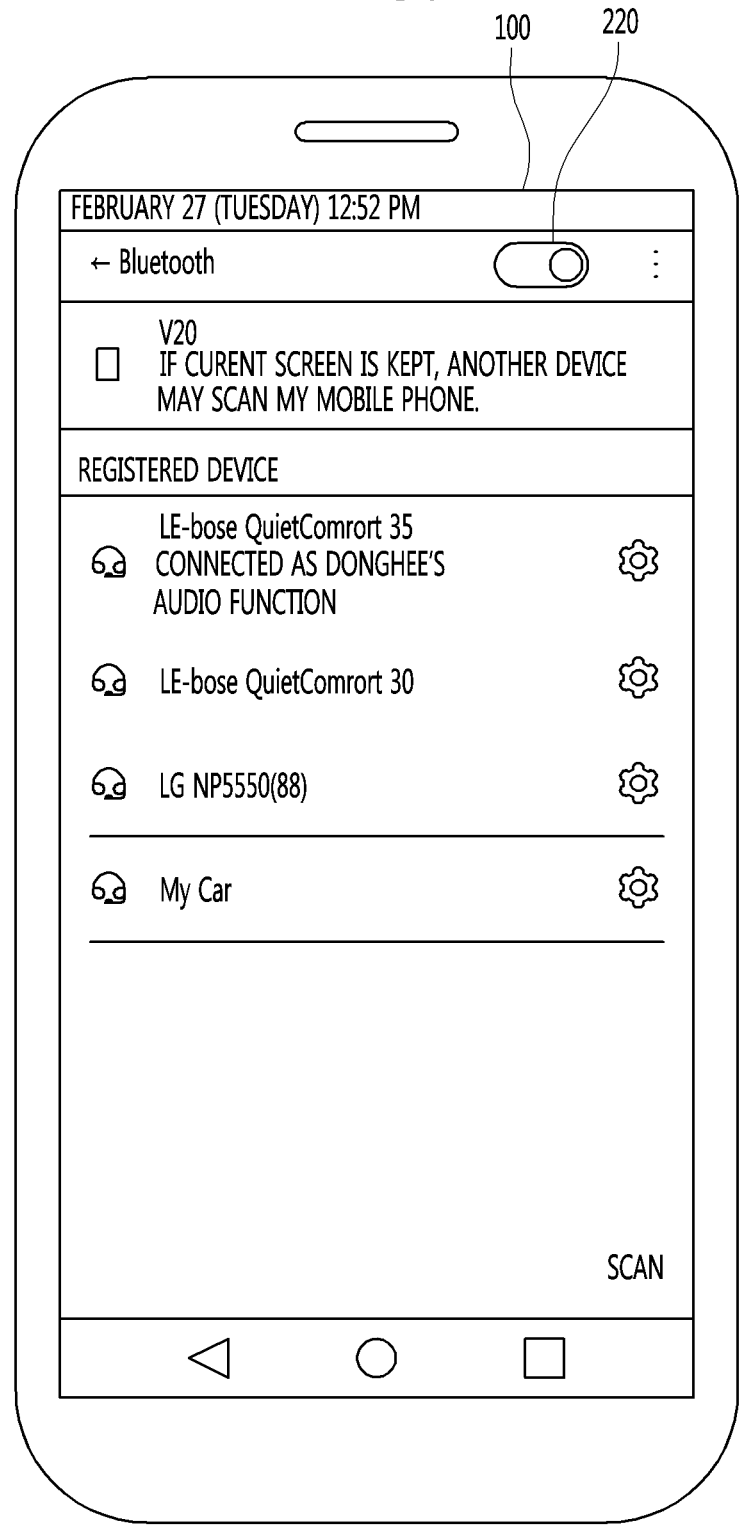
Figure 2C:
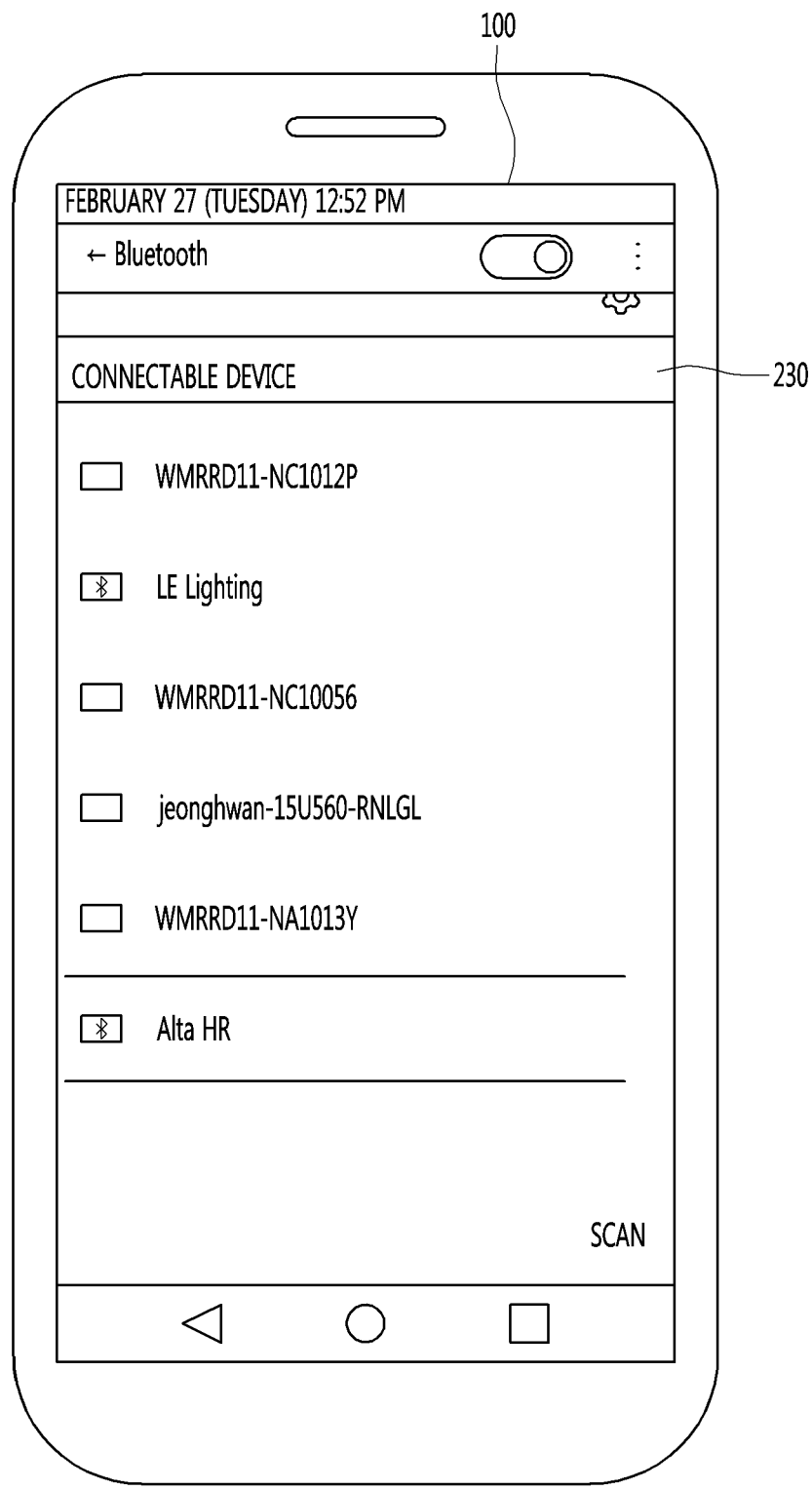

In the connection menu show in FIG. 2B, when the user presses a scan button 220, the terminal 100 performs scanning. When scanning ends, as shown in FIG. 2C, the terminal displays a list 230 of scanned connectable devices.

The user may confirm and select a device to be connected from the list. In this case, the terminal may be connected to the selected device.

Figure 2D:
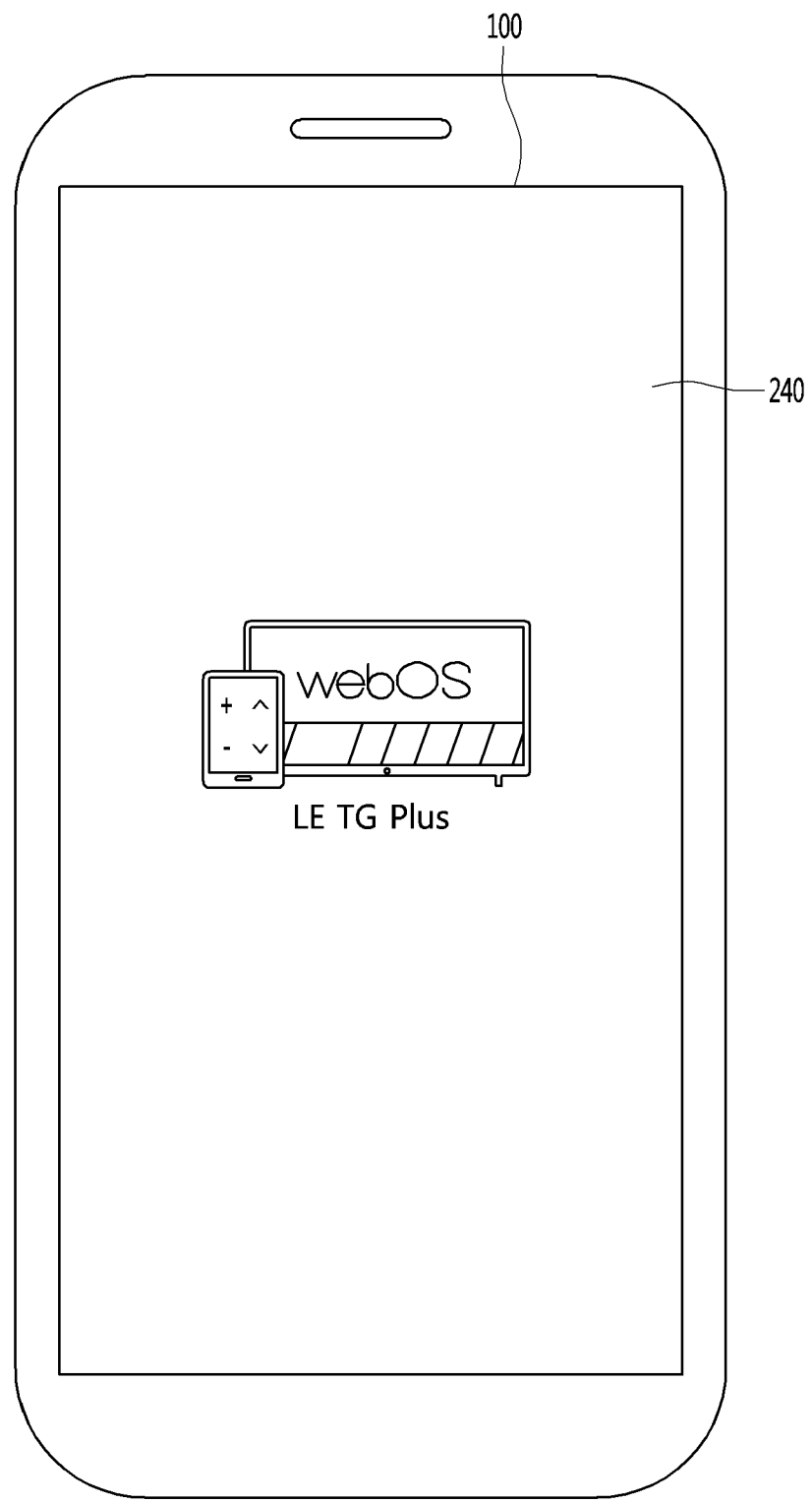

As shown in FIG. 2D, the terminal executes a dedicated application for controlling the connected device, and the user may control the connected device using the control screen of the dedicated application.

In order to connect the terminal with another device, many operations may have to be performed.

In addition, as shown in FIG. 2C, since the list of scanned connectable devices includes device names such as WMRRD11-NC1012P, it may be difficult for the user to grasp which list item corresponds to which device and to accurately determine which device is desired to be controlled.

Furthermore, various dedicated applications capable of controlling various devices may need to be identified and installed since the dedicated application for controlling the connected device is executed at the terminal.

Figure 3:
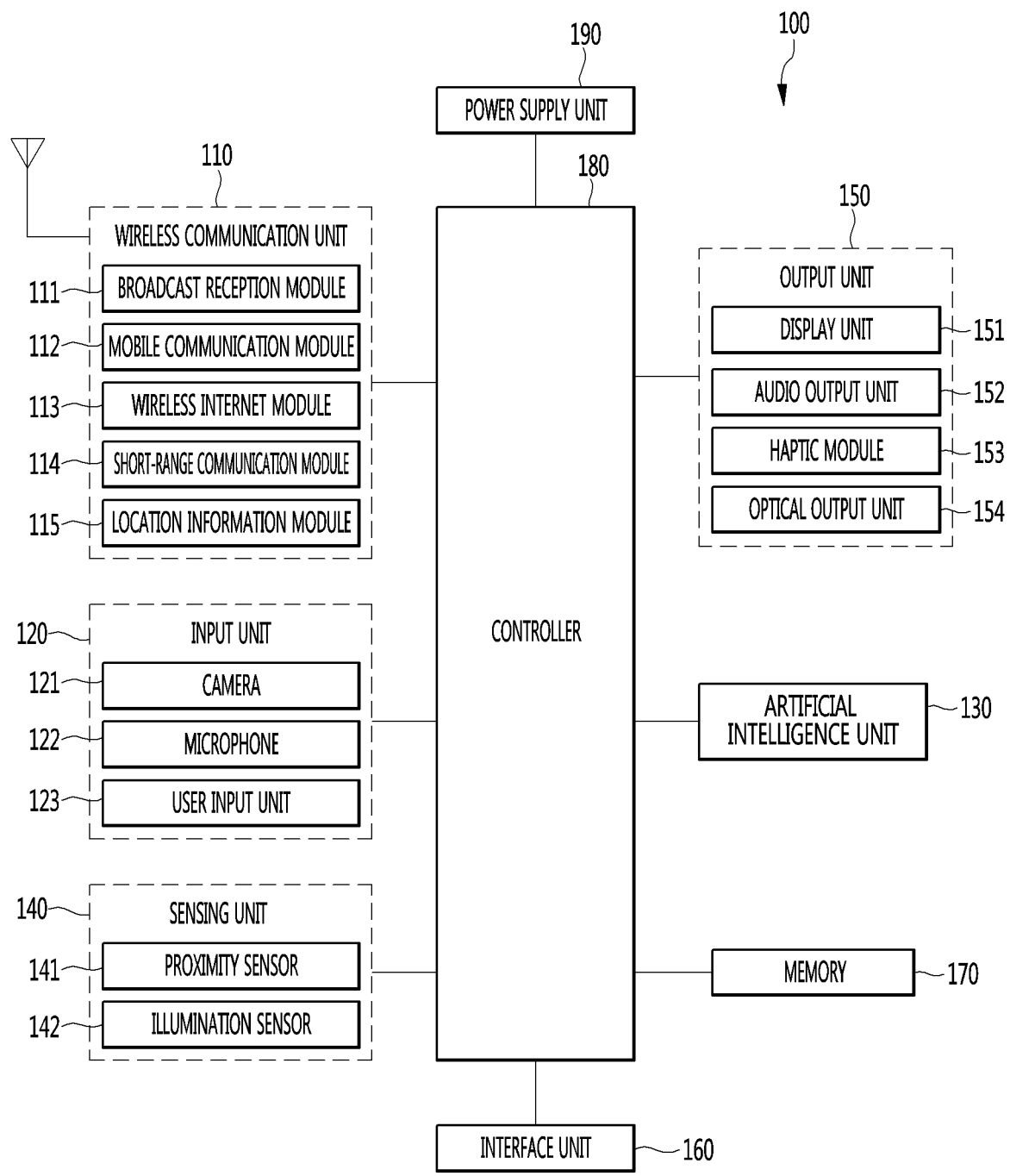
FIG. 3 is a block diagram illustrating a terminal 100 according to an embodiment of the present invention.

FIG. 3 is a block diagram illustrating a terminal 100 according to an embodiment of the present invention.

The terminal 100 may include a wireless communication unit 110, an input unit 120, an artificial intelligence unit 130, a sensing unit 140, an output unit 150, an interface unit 160, a memory 170, a controller 180, a power supply unit 190 and the like.

FIG. 3 illustrates the terminal having various components, but it is understood that implementing all of the illustrated components is not a requirement, and that greater or fewer components may alternatively be implemented.

In more detail, the wireless communication unit 110 of those components may typically include one or more modules which permit wireless communication between the terminal 100 and a wireless communication system, between the terminal 100 and another terminal 100, or between the terminal 100 and an external server. Further, the wireless communication unit 110 typically includes one or more modules which connect the terminal 100 to one or more networks.

The wireless communication unit 110 may include at least one of a broadcast reception module 111, a mobile communication module 112, a wireless Internet module 113, a short-range communication module 114, a location information module 115 and the like.

The input unit 120 may include a camera 121 or an image input unit for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

An artificial intelligence unit 130 is responsible for processing information based on artificial intelligence technology and may include one or more modules for performing at least one of learning of information, inference of information, perception of information and processing of a natural language.

The artificial intelligence unit 130 may perform at least one of learning, inference and processing of vast amounts of information (big data) such as information stored in the terminal, surrounding environmental information of the terminal and information stored in a communicable external storage, using machine learning technology. In addition, the artificial intelligence unit 130 may control the terminal to predict (infer) executable operation of at least one terminal and to perform most feasible operation of the at least one predicted operation, using the information learned using the machine learning technology.

The machine learning technology refers to technology of collecting and learning a large amount of information based on at least one algorithm and determining and predicting information based on the learned information. Learning of information refers to operation of grasping the characteristics, rules and criteria of judgement of the information, quantifying a relationship between information and information, and predicting new data using a quantified pattern.

An algorithm used by such machine learning technology may be a statistical based algorithm and may include, for example, a decision tree using a tree structure as a prediction model, an artificial neural network for emulating the neural network structure and function of an organism, genetic programing based on biological evolutionary algorithms, clustering for distributing observed examples into subsets such clusters, and a Monte-Carlo method of calculating the probability of a function value through a randomly extracted number.

As a field of machine learning technology, deep learning technology refers to technology of performing at least one of learning, determining and processing of information using an artificial neural network algorithm. The artificial neural network may have a structure for connecting a layer with a layer and transmitting data between the layer and the layer. Such deep learning technology may learn vast amounts of information through an artificial neural network using a graphic processing unit (GPU) optimized for parallel computation.

Meanwhile, the artificial intelligence unit 130 may collect (sense, monitor, extract, detect or receive) signals, data, information, etc. input to or output from the components of the terminal in order to collect vast amounts of information for applying machine learning technology. In addition, the artificial intelligence unit 130 may collect (sense, monitor, extract, detect or receive) data, information, etc. stored in an external storage (e.g., a cloud server) connected through communication. More specifically, collection of information may be understood as the term including sensing of information through a sensor, extraction of information stored in the memory 170, or reception of information from the external storage through communication.

The artificial intelligence unit 130 may sense information in the terminal, surrounding environment information of the terminal and user information through the sensing unit 140. In addition, the artificial intelligence unit 130 may receive a broadcast signal and/or broadcast related information, wireless signal, wireless data, etc. through the wireless communication unit 110. In addition, the artificial intelligence unit 130 may receive image information (or signal), audio information (or signal), data or information input by a user from the input unit.

Such an artificial intelligence unit 130 may collect vast amounts of information in real time in the background and learn the information, and store information processed in an appropriate form (e.g. knowledge graph, command policy, personalization database, dialog engine, etc.) in the memory 170.

In addition, when operation of the terminal is predicted based on the information learned using the machine learning technology, the artificial intelligence unit 130 may control the components of the terminal and send a control command for executing the predicted operation to the controller 180, in order to execute the predicted operation. The controller 180 may control the terminal based on the control command to execute the predicted operation.

Meanwhile, when specific operation is performed, the artificial intelligence unit 130 may analyze history information indicating performing of the specific operation through machine learning technology and update existing learned information based on the analyzed information. Therefore, the artificial intelligence unit 130 may improve information prediction accuracy.

Meanwhile, in this specification, the artificial intelligence unit 130 and the controller 180 may be understood as the same component. In this case, the function performed by the controller 180 described in this specification may be described as being performed by the artificial intelligence unit 130, and the controller 180 may be referred to as the artificial intelligence unit 130 or the artificial intelligence unit 130 may be referred to as the controller 180.

Alternatively, in this specification, the artificial intelligence unit 130 and the controller 180 may be understood as different components. In this case, the artificial intelligence unit 130 and the controller 180 may perform a variety of control on the terminal through data exchange. The controller 180 may perform at least one function on the terminal based on a result derived from the artificial intelligence unit 130 or control at least one of the components of the terminal.

Further, the artificial intelligence unit 130 may operate under control of the controller 180. In some embodiments the artificial intelligence unit may be implemented by one or more hardware controllers or processors, similar to that described with respect to the controller 180.

The sensing unit 140 may include one or more hardware sensors configured to sense internal information of the terminal, the surrounding environment of the terminal, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The terminal 100 may be configured to utilize a combination of information sensed by at least two of the sensors.

The output unit 150 is typically configured to output various types of information, such as audio, video, tactile output, and the like. The output unit 150 may include at least one of a display unit 151, an audio output unit 152, a haptic module 153, and an optical output unit 154. The display unit 151 may have an inter-layered structure or an integrated structure with a touch sensor in order to facilitate a touchscreen. The touchscreen may provide an output interface between the terminal 100 and a user, as well as function as the user input unit 123 which provides an input interface between the terminal 100 and the user.

The interface unit 160 serves as an interface with various types of external devices connected to the terminal 100. The interface unit 160, for example, may include at least one of wired or wireless ports, external power supply ports, wired or wireless data ports, memory card ports, ports for connecting a device having an identification module, audio input/output (I/O) ports, video I/O ports, earphone ports, and the like. In some cases, the terminal 100 may perform assorted control functions associated with a connected external device, in response to the external device being connected to the interface unit 160.

The memory 170 is typically implemented to store data to support various functions of the terminal 100. For instance, the memory 170 may be configured to store application programs executed in the terminal 100, data or instructions for operations of the terminal 100, data for operation of the artificial intelligence unit 130 (e.g., at least one piece of algorithm information for machine learning, etc.), and the like. Some of these application programs may be downloaded from an external server via wireless communication. Other application programs may be installed within the terminal 100 at time of manufacturing or shipping, for basic functions of the terminal 100 (for example, receiving a call, placing a call, receiving a message, sending a message, and the like). The application programs may be stored in the first memory 170, installed in the terminal 100, and executed by the controller 180 to perform an operation (or function) of the terminal.

The controller 180 typically functions to control overall operation of the terminal 100, in addition to the operations associated with the application programs. The controller 180 may provide or process information or functions appropriate for a user by processing signals, data, information and the like, which are input or output by the above-described components, or executing application programs stored in the memory 170.

Furthermore, the controller 180 may control at least some of the components illustrated in FIG. 3, in order to execute the application programs stored in the memory 170. In addition, the controller 180 may execute the application programs by operating at least two of the components included in the terminal 100 for operation.

The power supply unit 190 may receive external power or internal power and supply appropriate power required for operating respective components included in the terminal 100 under control of the controller 180. The power supply unit 190 may include a battery, and the battery may be an embedded battery or a replaceable battery.

Hereinafter, each aforementioned component will be described in more detail with reference to FIG. 3, prior to explaining various exemplary embodiments implemented by the terminal 100 having the configuration.

First, the wireless communication unit 110 will be described. The broadcast reception module 111 of the wireless communication unit 110 may receive a broadcast signal and/or broadcast associated information from an external broadcast managing server via a broadcast channel. The broadcast channel may include a satellite channel and a terrestrial channel. Two or more broadcast reception modules may be included in the terminal 100, for simultaneous reception of two or more broadcast channels or for switching between broadcast channels.

The broadcast managing server may be a server which generates and transmits a broadcast signal and/or broadcast associated information, or a server which receives a pre-generated broadcast signal and/or broadcast associated information, and sends such items to the terminal. The broadcast signal may be implemented using any of a TV broadcast signal, a radio broadcast signal, a data broadcast signal, and a combination of a data broadcast signal and a TV or radio broadcast signal.

The broadcast signal may be encoded according to at least one of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast reception module 111 may receive the digital broadcast signals using a method appropriate for the transmission method utilized.

Examples of broadcast associated information may include information associated with a broadcast channel, a broadcast program, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast reception module 111 may be stored in a suitable device, such as the memory 170.

The mobile communication module 112 may transmit and/or receive wireless signals to and from a base station, an external terminal, a server, and the like over a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video (telephony) call signals, or various formats of data to support communication of text and multimedia messages.

The wireless Internet module 113 is configured to facilitate wireless Internet access. This module may be internally or externally coupled to the terminal 100. The wireless Internet module 113 may transmit and/or receive wireless signals via communication networks according to wireless Internet technologies.

Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communication and to support short-range communication using BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communication between a terminal 100 and a wireless communication system, between the terminal 100 and another terminal 100 or between the terminal 100 and a network where another terminal 100 (or an external server) is located, via wireless area networks. One example of the wireless area networks is a wireless personal area networks.

In some embodiments, another terminal 100 may be a wearable device, for example, a smart watch, smart glasses or a head mounted display (HMD), which is able to exchange data with the terminal 100 (or otherwise cooperate with the terminal 100). The short-range communication module 114 may sense (or recognize) a wearable device capable of performing communication with the terminal 100 in the vicinity of the terminal 100. In addition, when the sensed wearable device is a device authenticated to communicate with the terminal 100, the controller 180, for example, may transmit data processed in the terminal 100 to the wearable device via the short-range communication module 114. Hence, a user of the wearable device may use the data processed in the terminal 100 on the wearable device. For example, when a call is received in the terminal 100, the user may answer the call using the wearable device. Also, when a message is received in the terminal 100, the user may check the received message using the wearable device.

The location information module 115 is generally configured to acquire the position (or the current position) of the terminal. As an example, the location information module 115 includes a Global Position System (GPS) module, a Wi-Fi module, or both. For example, when the terminal uses a GPS module, the position of the terminal may be acquired using a signal sent from a GPS satellite.

As another example, when the terminal uses the Wi-Fi module, the position of the terminal may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the terminal. The location information module 115 is used to acquire the position (or the current position) of the terminal and is not limited to a module for directly calculating or acquiring the position of the terminal.

The input unit 120 may be configured to permit input of image or video information (or signal), audio information (or signal), data or user input information. For input of image or video information, the terminal 100 may include one or a plurality of cameras 121. The camera 121 may process image frames of still pictures or video obtained by image sensors in a video or image capture mode. The processed image frames may be displayed on the display unit 151 or stored in memory 170. In some cases, the plurality of cameras 121 provided in the terminal 100 may be arranged in a matrix configuration to permit a plurality of images having various angles or focal points to be input to the terminal 100. As another example, the plurality of cameras 121 may be located in a stereoscopic arrangement to acquire left and right images for implementing a stereoscopic image.

The microphone 122 processes an external sound signal into an electrical audio signal. The processed audio data may be processed in various manners according to a function (or an application program) being executed in the terminal 100. If desired, the microphone 122 may include assorted noise removing algorithms to remove unwanted noise generated in the course of receiving the external audio signal.

The user input unit 123 is a component that permits input by a user. When information is input through the user input unit 123, the controller 180 may control operation of the terminal 100 to correspond to the input information. The user input unit 123 may include one or more of a mechanical input element (for example, a mechanical key, a button located on a front and/or rear surface or a side surface of the terminal 100, a dome switch, a jog wheel, a jog switch, and the like), or a touch-sensitive input element, among others. As one example, the touch-sensitive input element may be a virtual key or a soft key, which is displayed on a touchscreen through software processing, or a touch key which is located on the terminal at a location that is other than the touchscreen. On the other hand, the virtual key or the visual key may be displayed on the touchscreen in various shapes, for example, graphic, text, icon, video, or a combination thereof.

The sensing unit 140 is generally configured to sense one or more of internal information of the terminal, surrounding environment information of the terminal, user information, or the like and to generate sensing signals corresponding thereto. The controller 180 generally controls operation of the terminal 100 or execute data processing, functions or operation associated with an application program installed in the terminal 100 based on such sensing signals. The sensing unit 140 may be implemented using any of a variety of sensors, some of which will now be described in more detail.

The proximity sensor 141 may include a sensor to sense presence or absence of an object approaching a detection surface, or an object located near a detection surface, by using an electromagnetic field, infrared rays, or the like without a mechanical contact. The proximity sensor 141 may be arranged at an inner region of the terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared-ray proximity sensor, and the like. When the touchscreen is implemented as a capacitance type, the proximity sensor 141 may sense proximity of an object relative to the touchscreen by changes of an electromagnetic field, which is responsive to an approach of an object with conductivity. In this case, the touchscreen (touch sensor) may also be categorized as a proximity sensor.

For convenience of description, the term "proximity touch" will often be referred to herein to denote the scenario in which an object is positioned to be proximate to the touchscreen without contacting the touchscreen. The term "contact touch" will often be referred to herein to denote the scenario in which an object makes physical contact with the touchscreen. For the position corresponding to the proximity touch of the object relative to the touchscreen, such position will correspond to a position where the object is perpendicular to the touchscreen. The proximity sensor 141 may sense proximity touch, and proximity touch patterns (for example, distance, direction, speed, time, position, moving status, and the like).

In general, the controller 180 processes data (or information) corresponding to proximity touches and proximity touch patterns sensed by the proximity sensor 141, and cause output of visual information corresponding to the processed data on the touchscreen. In addition, the controller 180 may control the terminal 100 to execute different operations or process different data according to whether a touch with respect to a point on the touchscreen is either a proximity touch or a contact touch.

A touch sensor may sense a touch applied to the touchscreen, such as display unit 151, using any of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the touchscreen, or convert capacitance occurring at a specific part of the touchscreen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touchscreen or a touch key provided in addition to the touchscreen. Whether to execute the same or different control according to the object which provides a touch input may be decided based on a current operating state of the terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 configuring the input unit 120 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on the display device. The photo sensor may be configured to scan movement of the physical object in proximity to the touchscreen. In more detail, the photo sensor may include photo diodes and transistors at rows and columns to scan content received at the photo sensor using an electrical signal which changes according to the amount of light applied to the photo diode. Namely, the photo sensor may calculate the coordinates of the physical object according to variation of light to thus obtain position information of the physical object.

The display unit 151 is generally configured to display (output) information processed in the terminal 100. For example, the display unit 151 may display execution screen information of an application program executing at the terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method may be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference therebetween by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit may receive the 3D image (the image of the reference view point and the image of the extended view point) and extract the left image and the right image, or may receive the 2D image and change it into a left image and a right image.

The audio output unit 152 is generally configured to output audio data. Such audio data may be obtained from any of a number of different sources, such that the audio data may be received from the wireless communication unit 110 or may have been stored in the memory 170. The audio data may be output in modes such as a signal reception mode, a call mode, a record mode, a voice recognition mode, a broadcast reception mode, and the like. The audio output unit 152 may output an audio signal related to a particular function (e.g., a call signal reception sound, a message reception sound, etc.) performed by the terminal 100. The audio output unit 152 may also be implemented as a receiver, a speaker, a buzzer, or the like.

A haptic module 153 may be configured to generate various tactile effects that a user feels. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the terminal 100.

An optical output unit 154 may output a signal for indicating event generation using light of a light source. Examples of events generated in the terminal 100 may include message reception, call signal reception, a missed call, an alarm, a schedule notice, an email reception, information reception through an application, and the like.

A signal output by the optical output unit 154 may be implemented in such a manner that the terminal emits monochromatic light or light with a plurality of colors. The signal output may be terminated as the terminal senses that a user has checked the generated event, for example.

The interface unit 160 serves as an interface for external devices to be connected with the terminal 100. For example, the interface unit 160 may receive data transmitted from an external device, receive and transfer power to elements and components within the terminal 100, or transmit internal data of the terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the terminal 100 is connected with an external cradle, the interface unit 160 may serve as a passage to allow power from the cradle to be supplied to the terminal 100 or may serve as a passage to allow various command signals input by the user from the cradle to be transferred to the terminal 100 therethrough. Various command signals or power input from the cradle may operate as signals for recognizing that the terminal 100 is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The terminal 100 may also be operated in relation to a network storage device that performs the storage function of the memory 170 over a network, such as the Internet.

As described above, the controller 180 may typically control the general operations of the terminal 100. For example, the controller 180 may set or release a lock state for restricting a user from inputting a control command with respect to applications when a status of the terminal meets a preset condition.

The controller 180 may also perform the controlling and processing associated with voice calls, data communications, video calls, and the like, or perform pattern recognition processing to recognize a handwriting input or a picture drawing input performed on the touchscreen as characters or images, respectively. In addition, the controller 180 may control one or a combination of those components in order to implement various exemplary embodiments disclosed herein.

The power supply unit 190 receives external power or provide internal power and supply the appropriate power required for operating respective elements and components under control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium or a similar medium thereof using, for example, software, hardware, or any combination thereof.

Meanwhile, although the input unit 120 and the sensing unit 140 are described as separate components, the sensing unit 140 may include the input unit 120.

In this specification, the term "wireless communication unit 110" may be used interchangeably with the term "communication unit".

In this specification, the term "memory 170" may be used interchangeably with the term "storage unit".

In this specification, the term "controller 180" may be used interchangeably with the term "processor".

In this specification, the term "wireless communication unit" may be used interchangeably with the term "wireless communicator".

In this specification, the term "input unit" may be used interchangeably with the term "input interface".

In this specification, the term "user input unit" may be used interchangeably with the term "user input interface".

In this specification, the term "sensing unit" may be used interchangeably with the term "sensor".

In this specification, the term "output unit" may be used interchangeably with the term "output interface".

In this specification, the term "display unit" may be used interchangeably with the term "display".

In this specification, the term "audio output unit" may be used interchangeably with the term "audio output interface".

Meanwhile, the controller 180 may include an application-specific integrated circuit (ASIC), another chipset, a logic circuit and/or a data processor.

In this specification, the term "artificial intelligence unit 130" may be used interchangeably with the term "controller", "processor", "artificial intelligence controller", or "artificial intelligence processor".

Meanwhile, the wireless communication unit 110 may include a network interface. The network interface refers to a device for enabling a terminal to perform wired or wireless communication with a plurality of target devices and may include an energy efficient interface and a legacy interface.

The energy efficient interface refers to a device for performing low-power wireless communication with low energy consumption and means a unit (or a module) for enabling a terminal to discovering a target device to be connected or to transmit data.

The legacy interface refers to a device for wireless communication and means a unit (or a module) for enabling a terminal to discovering another device to be connected or to transmit data.

Meanwhile, the display unit 151 may be a unit (or a module) for outputting data received via the network interface or data stored in the memory 170 under control of the controller 180.

The controller 180 controls the network interface to receive advertisement information from a target device, controls a communication unit to transmit a scan request to the target device and to receive a scan response from the target device in response to the scan request, and controls the network interface to transmit a connect request message to the server device for BLUETOOTH connection establishment with the target device.

In addition, the controller 180 controls the communication unit to read and write data from and in the target device using an attribute protocol, after a BLUETOOTH LE connection is established through the above-described connection procedure.

Hereinafter, procedures of BLUETOOTH low energy (BLE) technology will be briefly described.

BLE procedures may be divided into a device filtering procedure, an advertising procedure, a scanning procedure, a discovering procedure, a connecting procedure, etc.

Device Filtering Procedure

The device filtering procedure is a method of reducing the number of devices for responding to requests, instructions, notification, etc. in a controller stack.

Since it is unnecessary for all devices to respond to received requests, the controller stack may reduce the number of transmitted requests, thereby reducing power consumption in the BLE controller stack.

An advertisement device or a scanning device may perform the device filtering procedure in order to restrict devices for receiving an advertisement packet, a scan request or a connect request.

Here, the advertisement device refers to a device for transmitting an advertisement event, that is, performing advertisement, and is also referred to as an advertiser. A plurality of target devices 200, 300, 400 and 500 corresponds to the advertisement device.

The scanning device refers to a device for performing scanning or a device for transmitting a scan request. The terminal 100 corresponds to the scanning device.

In BLE, if the scanning device receives some advertisement packets from the advertisement device, the scanning device transmits the scan request to the advertisement device.

However, if the device filtering procedure is used and thus scan request transmission is unnecessary, the scanning device may ignore advertisement packets transmitted from the advertisement device.

Even in a connect request process, the device filtering procedure may be used. If the device filtering procedure is used in the connect request process, by ignoring a connect request, it is unnecessary to transmit a response to the connect request.

Advertising Procedure

The advertisement device performs an advertising procedure in order to perform a nondirectional broadcast to devices in an area.

Here, the nondirectional broadcast refers to a broadcast in all directions, rather than a broadcast in a specific direction.

In contrast, a directional broadcast refers to a broadcast in a specific direction. The nondirectional broadcast is performed without a connecting procedure between the advertisement device and a device in a listening state (hereinafter, referred to as a listening device).

The advertising procedure is used to establish a BLUETOOTH connection with a neighboring initiating device.

Alternatively, the advertising procedure may be used to provide a periodic broadcast of user data to scanning devices which are listening through an advertisement channel.

In the advertising procedure, all advertisements (or advertisement events) are broadcast through an advertisement physical channel.

The advertisement devices may receive a scan request from the listening devices which are listening in order to obtain additional user data from the advertisement device. The advertisement device transmits a response to the scan request to the device, which has transmitted the scan request, through the same advertisement physical channel as the advertisement physical channel, through which the scan request has been received.

The broadcast user data sent as a portion of the advertisement packets is dynamic data, but the scan response data is static data.

The advertisement device may receive the connect request from the initiating device through the advertisement (broadcast) physical channel. If the advertisement device uses a connectable advertisement event and the initiating device is not filtered by the device filtering procedure, the advertisement device stops advertisement and enters a connected mode. The advertisement device may resume advertisement after the connected mode.

Scanning Procedure

A device for performing scanning, that is, a scanning device, performs a scanning procedure in order to listen to a nondirectional broadcast of user data from the advertisement devices using the advertisement physical channel.

The scanning device transmits the scan request to the advertisement device through the advertisement physical channel in order to request additional data from the advertisement device. The advertisement device transmits a scan response including additional data requested by the scanning device through the advertisement physical channel in response to the scan request. The scanning procedure may be used while a connection with another BLE device is established over a BLE piconet.

If the scanning device is in an initiator mode in which the broadcast advertisement event may be received and a connect request may be initiated, the scanning device may transmit the connect request to the advertisement device through the advertisement physical channel, thereby starting a BLUETOOTH connection with the advertisement device.

If the scanning device transmits the connect request to the advertisement device, the scanning device stops initiator mode scanning for additional broadcast and enters the connected mode.

Discovering Procedure

Devices capable of performing BLUETOOTH communication (hereinafter, referred to as "BLUETOOTH devices") perform the advertising procedure and the scanning procedure in order to discover neighboring devices or to be discovered by other devices in a given area.

The discovering procedure is performed asymmetrically. A BLUETOOTH device which is trying to discover other neighboring devices is referred to as a discovering device and listens in order to discover devices for advertising a scannable advertisement event. A BLUETOOTH device, which may be discovered by and used in other devices, is referred to as a discoverable device, and actively broadcasts an advertisement event through the advertisement (broadcast) physical channel in order to be scannable by other devices.

The discovering device and the discoverable device may already be connected to other BLUETOOTH devices over the piconet.

Connecting Procedure

The connecting procedure is asymmetrical. The connecting procedure makes a request such that, while a specific BLUETOOTH device performs the advertising procedure, another BLUETOOTH device performs the scanning procedure.

That is, the advertising procedure may be targeted and, as a result, only one device responds to the advertisement. After the accessible advertisement event is received from the advertisement device, the connect request may be transmitted to the advertisement device through the advertisement (broadcast) physical channel, thereby initiating a connection.

Next, the operation states of the BLE technology, that is, an advertising state, a scanning state, an initiating state and a connection state, will be briefly described.

Advertising State

A link layer (LL) enters an advertising state by an indication of a host (stack). If the link layer is in an advertising state, the link layer transmits advertisement packet data units (PDUs) in the advertisement events.

Each advertisement event includes at least one advertisement PDU and the advertisement PDUs are transmitted through used advertisement channel indices. The advertisement event may be terminated when the advertisement PDUs have been transmitted through the used advertisement indices or may be terminated earlier when the advertisement device needs to secure a space in order to perform other functions.

Scanning State

The link layer enters a scanning state by an indication of the host (stack). In the scanning state, the link layer listens to advertisement channel indices.

The scanning state includes a passive scanning type and an active scanning type, and each scanning type is determined by the host.

A separate time for performing scanning or an advertisement channel index is not defined.

In the scanning state, the link layer listens to the advertisement channel index during a scanWindow duration. A scanInterval is defined as an interval between start points of two consecutive scan windows.

If scheduling collision does not occur, the link layer listens for completion of all scanIntervals of the scanWindow as indicated by the host. In each scanWindow, the link layer scans other advertisement channel indices. The link layer uses all available advertisement channel indices.

In passive scanning, the link layer only receives packets and does not transmit any packets.

In active scanning, the link layer listens in order to depend on the advertisement PDU type capable of requesting additional information related to the advertisement device and the advertisement PDUs from the advertisement device.

Initiating State

The link layer enters the initiating state by an indication by the host (stack).

If the link layer is in the initiating state, the link layer listens to the advertisement channel indices.

During the initiating state, the link layer listens to the advertisement channel index during the scanWindow duration.

Connection State

The link layer enters the connection state when the device for transmitting a connection request, that is, the initiating device, transmits a CONNECT_REQ PDU to the advertisement device or when the advertisement device receives CONNECT_REQ PDU from the initiating device.

After the link layer enters the connection state, a connection is considered to be established. However, the connection may not be established when the link layer enters the connection state. A difference between a newly established connection and a previously established connection is only a link layer connection supervision timeout.

When two devices are connected, the two devices may perform different functions.

A link layer for performing a master function is called a master and a link layer for performing a slave function is called a slave. The master controls timing of a connection event, and the connection event refers to a point in time when the master is synchronized with the slave.

Figure 4:
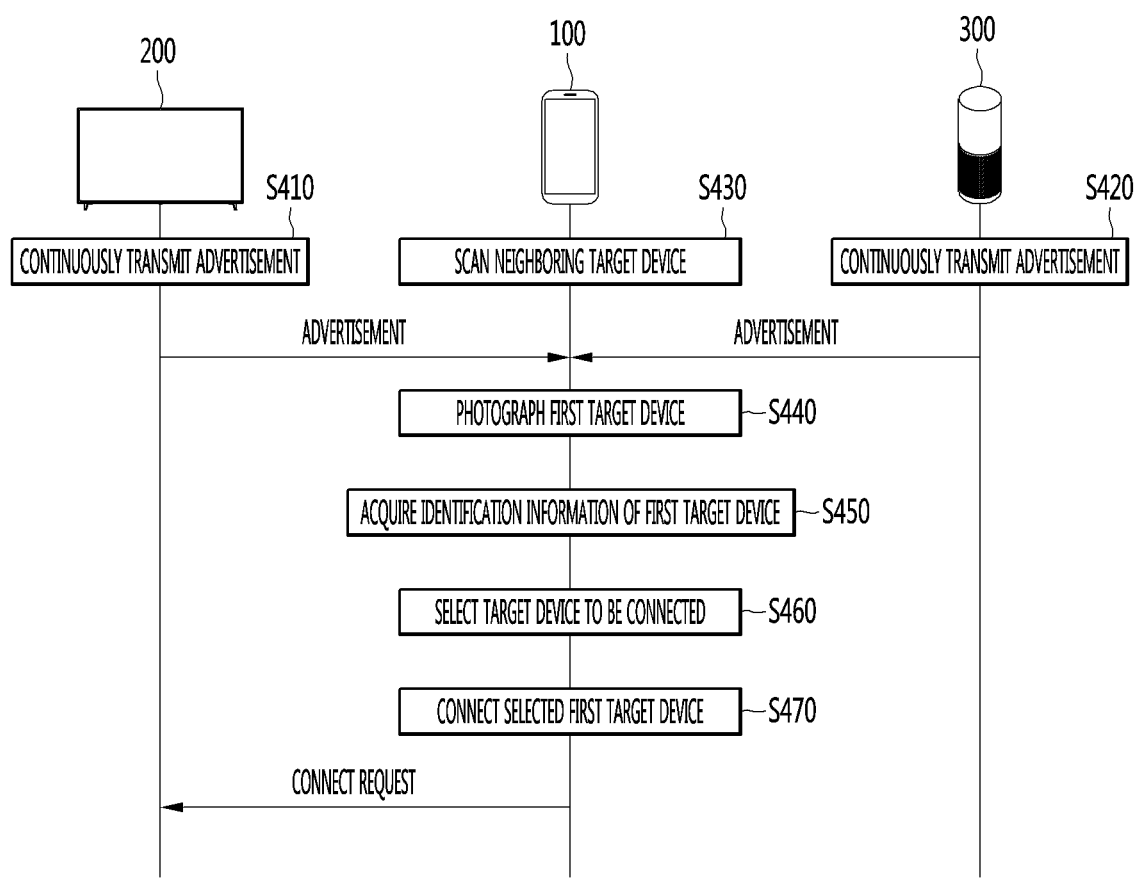
FIG. 4 is a diagram illustrating a method of operating a wireless communication system according to an embodiment of the present invention.

FIG. 4 is a diagram illustrating a method of operating a wireless communication system according to an embodiment of the present invention.

The plurality of target devices 200 and 300 may transmit advertisement information to the terminal 100 (S410 and S420).

In addition, the terminal 100 may scan neighboring target devices (S430).

Figure 5:
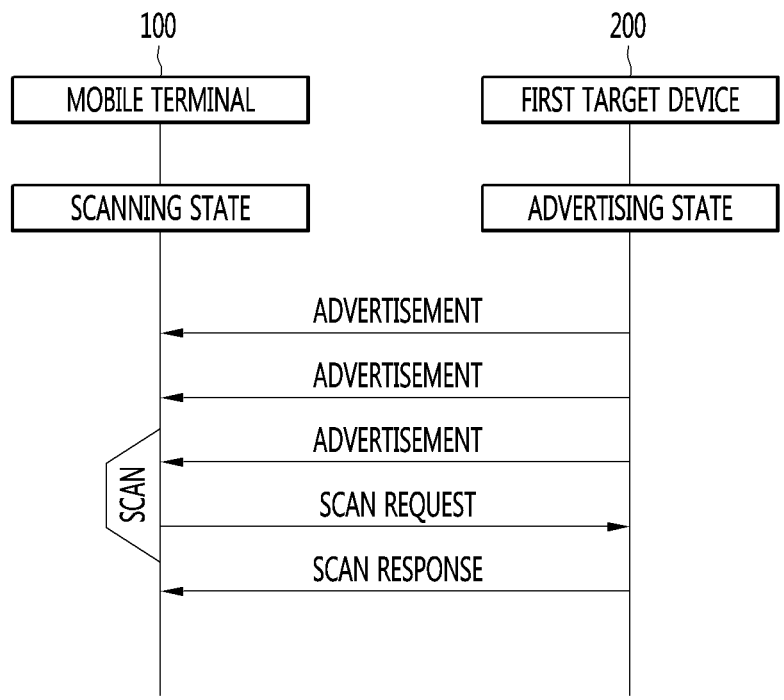
FIG. 5 is a diagram illustrating a process of establishing a connection between a terminal and a first target device.

This will be described with reference to FIGS. 5 and 6.

For example, the first target device 200 will be described. The first target device 200 in the advertising state may transmit advertisement information to neighboring devices for each advertisement event.

Here, a time between advertisement events may be defined as an advertising interval. In addition, the first target device 200 may transmit advertisement information to neighboring devices at each advertising interval.

The advertisement information may be used interchangeably with the term "advertisement packet" or "advertisement message".

The first target device 200 may transmit an advertisement packet including specific information to neighboring devices through a procedure of setting the advertisement packet.

Specifically, the first target device 200 performs an advertisement parameter setting procedure in order to include the specific information in the advertisement packet in a standby state.

First, the host of the first target device 200 transmits a Set Advertising Parameter Command to a controller in order to set parameters related to an advertisement packet transmission interval and an address.

The maximum transmission interval and minimum transmission interval of the advertisement packet, the type of the advertisement packet, the type of the address used in the advertisement packet, the advertisement channel used to transmit the advertisement packet, etc. may be set through the Set Advertising Parameter Command.

In addition, the host transmits a Set Advertising Data Command to the controller in order to set data used in advertisement packets including a data field.

The first target device may set data included in the advertisement packet through the Set Advertising Data Command.

For example, in order for the first target device to include data for a transport discovery service in the advertisement packet, data for Tabular Data Stream (TDS) may be included in the advertisement packet through the Set Advertising Data Command.

Thereafter, the host transmits an Enable Advertisement Command to the controller in order to start or stop operation of transmitting the advertisement packet.

The controller receives the Enable Advertisement Command from the host and then continuously transmits the advertisement packet to neighboring devices until the Enable Advertisement Command for stopping transmission of the advertisement packet is received from the host.

Thereafter, the first target device 200 enters the advertising state for transmitting the advertisement packet, and the controller of the first target device 200 periodically transmits the advertisement packet in the advertisement event.

The terminal 100 may set scanning parameters to perform scanning operation, in order to receive the advertisement packet from the neighboring devices in the standby state.

First, the host of the terminal 100 transmits a Set Scan Parameters Command to the controller in order to set parameters for scanning.

The type of the scanning operation such as passive scanning or active scanning, an interval at which scanning operation is performed, a scanWindow and the type of an address used in scan request packets may be set through the Set Scan Parameters Command.

After parameters for scanning operation is set through the Set Scan Parameters Command, the host transmits an Enable Scanning Command to the controller in order to start scanning operation.

Thereafter, the terminal 100 enters the scanning state in order to perform scanning operation and receives advertisement packets from the neighboring devices during the scanning window duration.

For example, the advertisement packets transmitted from the plurality of target devices may be received during the scanning duration of the terminal 100.

If the controller of Device 1 receives the advertisement packet, an advertising report is generated and transmitted to the host in order to report the advertisement packet.

At this time, the advertisement report may be called LE_Advertising_Report_Event, and may be generated based on one or a plurality of advertisement packets.

Figure 6:
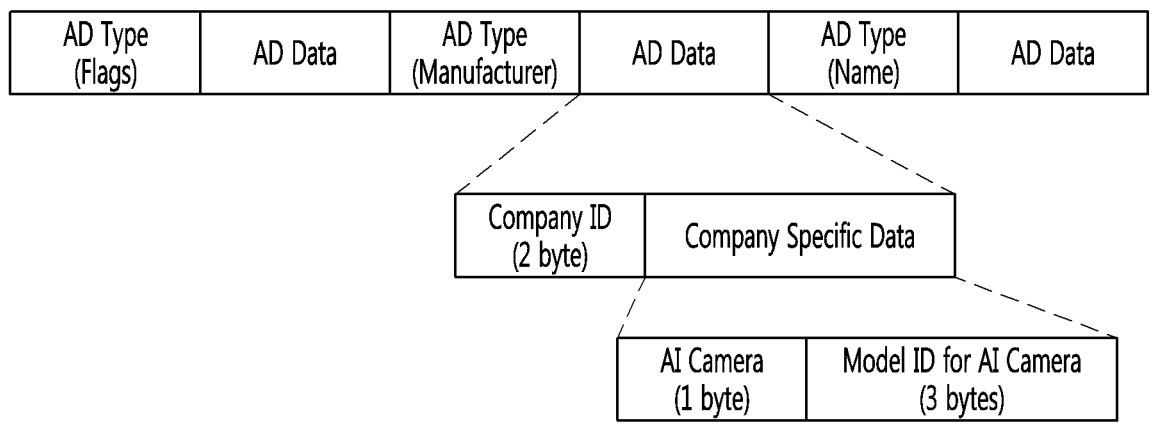
FIG. 6 is a diagram showing an advertisement packet transmitted by a first target device.

FIG. 6 is a diagram showing an example of the data format an advertisement packet.

Referring to FIG. 6, the advertisement packet has an Advertising Data (AD) structure, and the terminal 100 may parse the advertisement packet in order to find desired data.

Specifically, the plurality of target devices may include specific data in the advertisement packet in the AD structure through the above-described advertisement parameter setting procedure.

For example, the plurality of target devices may configure the advertisement packet in order to transmit transmission (Tx) power, data for providing TDS, and manufacturer information, which is information related to a manufacturer, through the advertisement packet.

The advertisement packet may be composed of a plurality of AD structures, and each AD structure may be composed of a length type value (LTV) structure.

A Length field may indicate the length of data, an AD Type field may indicate the type of included data, and AD Data may include actual data.

That is, each AD structure may include the Length field, the AD Type field and the AD Data field.

Here, the AD type may indicate the type of the data included in AD Data. In addition, the AD Data field may include data according to AD Type, and may be composed of one or a plurality of LTV structures.

Meanwhile, the advertisement information transmitted by the target device may include identification information of the target device. In addition, the identification information of the target device may be the model ID of the target device.

For example, the advertisement information transmitted by the second target device 300 may be the unique model ID of the second target device 300 which is the identification information of the second target device 300.

In another example, the advertisement information transmitted by the first target device 200 may be the unique model ID of the first target device 200 which is the identification information of the first target device 200.

In this case, the plurality of target devices may include the identification information of each of the plurality of target devices in the advertisement packet through the above-described advertisement parameter setting procedure.

In this case, the advertisement packet may include data indicating the model ID of the target device. Specifically, an extended field including data indicating the model ID of the target device may be configured using Manufacturer AD type. In this case, the extended field may include an AI camera field such that the terminal 100 recognizes that the target device is recognized through photographing, and may include a data field (Model ID for AI camera) indicating the model ID of the target device. In this case, data provided by the manufacturer of the target device (e.g., the ID of the manufacturer (Company ID), detailed data provided by the manufacturer, etc.) may also be included.

In addition, the advertisement information may include the access address of each of the plurality of target devices for accessing the plurality of target devices.

Meanwhile, the plurality of target devices may include a plurality of network interfaces (e.g., Wi-Fi, WiGig, BR/EDR, etc.) in addition to BLUETOOTH LE. In this case, the advertisement message may include information on the network interface supported by the target device.

Meanwhile, the controller 180 may receive a plurality of pieces of advertisement information including the identification information of the plurality of target devices from the plurality of target devices.

Specifically, the terminal 100 is initially in the standby state. In the standby state, the terminal 100 may not receive a message.

In addition, in the standby state, the terminal 100 may enter the advertising state, the scanning state or the initiating state.

In order to scan a neighboring target device supporting BLUETOOTH in the standby state, the terminal 100 may perform scanning. In this case, the terminal 100 may enter the scanning state and receive the advertisement packet from the neighboring target device.

In this case, the controller 180 may parse the received advertisement packet and acquire the model ID and access address of the target device.

For example, the controller 180 may parse the advertisement packet received from the first target device 200 and acquire the identification information of the first target device 200 (the model ID of the first target device 200) and the access address.

In another example, the controller 180 may parse the advertisement packet received from the second target device 300 and acquire the identification information of the second target device 300 (the model ID of the second target device 300) and the access address.

Meanwhile, the terminal 100 may acquire information on an alternative communication element (e.g., BLUETOOTH BR/EDR, Wi-Fi, Wi-Fi Direct, etc.) supported by the plurality of target devices through BLUETOOTH LE and information on a service (e.g., BLUETOOTH BR/EDR A2DP HFP, Wi-Fi Direct Miracast, Wi-Fi Direct File Transfer, etc.) capable of being provided through the alternative communication element.

The terminal 100 may be connected to the target device through the alternative communication element based on the acquired information and may provide various services through the connected alternative communication element.

Specifically, the terminal and the plurality of target devices may exchange information on the alternative communication element supported by each device and information on the service provided through the alternative communication element in the connection procedure of BLUETOOTH LE.

More specifically, the terminal 100 is in the scanning state in order to scan neighboring devices supporting BLUETOOTH, and the plurality of target devices is in the advertising state.

The plurality of target devices transmits advertisement information to the terminal 100 in the advertising state. At this time, the advertisement information may be transmitted to a plurality of devices in a broadcast manner through the advertisement channel, as described above.

Meanwhile, the terminal 100 may receive the advertisement information during the scanning window duration in the scanning state.

At this time, the advertisement information may include alternative communication element information indicating information on the alternative communication element supported by each of the plurality of devices and service information indicating information on the service provided through the alternative communication element.

The service information may be included as list information in which a plurality of services is listed. The alternative communication element information and the service information may be basic information for allowing the terminal 100 to select the alternative communication element and service to be enabled through GATT of BLUETOOTH LE.

The terminal 100, which has acquired the information on the alternative communication element supported by the target device and the information on the service provided through the alternative communication element through the advertisement information, may transmit a scan request message to the target device, if additional information is necessary.

Thereafter, the terminal 100 may receive a scan response message including the additional information from the target device.

In addition, the additional information may include the local name of the target device, a device class, a device type and/or a major service class.

Returning to FIG. 4, the controller 180 may control the camera to photograph the first target device among the plurality of target devices (S440). In addition, the controller 180 may acquire identification information of the first target device using the photographed image of the first target device (S450).

This will be described with reference to FIGS. 7 and 8.

The controller 180 may acquire the identification information of the first target device using a learned machine learning model. The process of learning the machine learning model is shown in FIG. 7.

Figure 7:
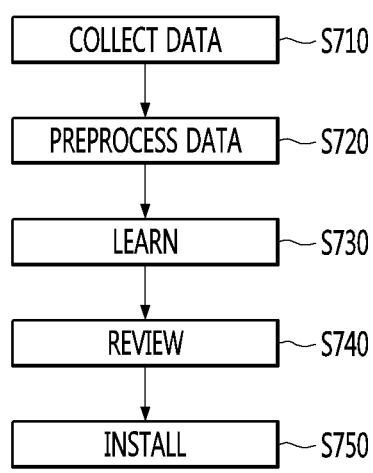
FIG. 7 is a diagram showing a learning process of a machine learning model.

Referring to FIG. 7, data for training of a neural network may be collected (S710). Here, the data is related to the plurality of target devices and may include an image, model ID, description, product SKU identification numbers, or the like, of each of the plurality of target devices.

Meanwhile, the collected data may be preprocessed (S720). Specifically, the collected data may be processed and classified into a state suitable for machine learning. In this case, an image format supported by a learning program, the number of data, data of each model, etc. may be classified/collected. In addition, the collected data may be divided into training data and review data.

The trained machine learning model may be generated by training the neural network using the training data in a machine learning manner (S730). Meanwhile, as the learning algorithm, Naive-Bayes, K-Nearest Neighbors, Logistic Regression, Support Vector Machine, etc. may be used in addition to the neural network.

The learning process of the neural network may be a process of labeling the image of the target device with identification information (model ID) and performing training.

In order to improve a recognition rate, the images of the target device photographed at various angles and distances with various intensities of illumination may be used as training data, and images obtained by photographing a portion or the whole of the target device may be used as training data.

The learning process of the neural network may be a process of labeling the image of each of the plurality of target devices with identification information (model ID) and performing training.

The machine learning model generated by training may be a model trained by labeling each of the plurality of target devices with identification information. If an image including a target device is input, the trained machine learning model may estimate and output the identification information (model ID), with which the target device is labeled.

If training ends, the result of training using the review data, that is, the trained machine learning model, is confirmed (S740), and, if accuracy of the result of review exceeds a target value, the trained machine learning model may be installed in the terminal 100 (S750).

In this case, a program for implementing the machine learning model may be stored in the storage unit.

In one embodiment of the present disclosure, as shown in FIG. 8, the controller 180 may control the camera of the terminal to photograph a first target device 600.

Specifically, if an input of selecting an icon for a BLUETOOTH Low Energy (BLE) connection is received, the controller 180 may enable the photographing function of the camera.

If the photographing function of the camera is enabled, the controller 180 may display a preview screen 810 indicating a preview image received through the camera.

In this case, the user may capture an image of the first target device 600 to be controlled of the plurality of target devices. If the target device is included in the image received through the camera, the controller 180 may perform photographing to acquire the photographed image of the first target device.

If the target device is included in the image received through the camera, the controller 180 may perform photographing at a predetermined time interval to acquire the photographed image of the first target device.

FIG. 9 is a diagram illustrating a method of generating a list of identification information estimated using a photographed image according to an embodiment of the present invention.

The controller 180 may photograph the first target device (S810). In addition, if the photographed image of the first target device is acquired, the controller 180 may estimate the identification information of the first target device (S820).

Specifically, the controller 180 may input the photographed image of the first target device to the trained machine learning model. In this case, the trained machine learning model may estimate the identification information of the first target device using the input image and output the estimated result, as shown in FIG. 9b.

Meanwhile, the trained machine learning model may estimate a plurality of pieces of identification information. If the shapes of the first target device and the second target devices are equal (the same product having the same appearance and different versions) or if the shapes of the first target device and the second target device are similar (series products having similar appearances), the trained machine learning model may estimate the plurality of pieces of identification information of the photographed first target device and output the estimated result.

If the plurality of pieces of identification information is estimated and output, the controller 180 may generate a list of estimated identification information (S830). In some embodiments, multiple trained machine learning models may be implemented, where each learning model is dedicated to being trained and outputting a different piece of identification information. For the purposes of this discussion, one learning model may be discussed, however it will be understood that various embodiments may include implementation of multiple dedicated learning models for generating different data points.

Returning to FIG. 4, the controller 180 may select a target device to be connected to the terminal 100 from among the plurality of scanned target devices (S460).

Specifically, the controller 180 may select the first target device as the target device to be connected to the terminal among the plurality of target devices, using the photographed image of the first target device and the plurality of pieces of advertisement information received from the plurality of target devices.

This will be described with reference to FIGS. 10 and 11.

FIGS. 10 and 11 are diagrams illustrating a method of selecting a target device for connection and control using estimated identification information and identification information of a plurality of target devices acquired by scanning, according to an embodiment of the present invention.

Assume that the terminal 100 receives the advertisement information of the first target device, the advertisement information of the second target device, the advertisement information of the third target device by scanning the first target device, the second target device and the third target device.

In addition, assume that the third target device does not support a target device recognition service through photographing and the advertisement information transmitted by the third target device does not include identification information (model ID).

In addition, assume that the first target device is photographed, the photographed image of the first target device is input to the machine learning model, and the machine learning model estimates the target device included in the image as the first target device and outputs the identification information of the first target device.

As shown in FIG. 11a, the controller 180 may input the photographed image to the machine learning model and estimate the identification information of the target device included in the photographed image (S1010). In this case, since the first target device is photographed, the machine learning model may determine that the target device included in the photographed image is the first target device, and output the identification information of the first target device.

Meanwhile, if the plurality of target devices is scanned and the plurality of pieces of advertisement information is received, the controller 180 may generate a list of the plurality of scanned target devices using the plurality of pieces of advertisement information (S1020).

Meanwhile, in the case of the target device which does not support the target device recognition service using photographing, the advertisement information may not include identification information (model ID).

Accordingly, the controller 180 may generate a list of target devices, which have transmitted the advertisement information including the identification information (model ID). That is, as shown in FIG. 11b, a list of target devices including the identification information of the first target device (model ID) and identification information of the second target device (model ID) may be generated.

Meanwhile, the controller 180 may select a target device to be connected with the terminal 100 from among the plurality of target devices.

Specifically, the controller 180 may select a target device to be connected with the terminal 100 from among the plurality of target devices, using the estimated identification information and the identification information included in the plurality of pieces of advertisement information.

For example, the controller 180 may find the estimated identification information in the scanned device list (S1030).

Meanwhile, since the machine learning model estimates the identification information of the target device included in the photographed image as the identification information of the first target device and the list of the scanned target devices includes the identification information of the first target device, as shown in FIG. 11c, the controller 180 may select the first target device as a target device to be connected.

Returning to FIG. 4, the controller 180 may enable a connection with the selected first target device (S470).

Specifically, the controller 180 may control the network interface to transmit the connect request to the first target device in order to establish a connection with the first target device using the BLUETOOTH LE method. In this case, the access address included in the advertisement information transmitted by the first target device may be used.

Meanwhile, when the connect request is received from the terminal 100, the first target device may enter the connected mode to establish a BLUETOOTH LE connection with the terminal 100.

Meanwhile, the controller 180 may control the network interface to read or write data from or in the target device using the attribute protocol, after a BLUETOOTH LE connection is established through the connection procedure.

Recently, technologies for identifying a subject using an AI camera have appeared. However, these technologies may only identify the type of the subject (a washing machine, a refrigerator, etc.), but may not accurately identify the model of the target device.

However, in the present invention, the target device is estimated using machine learning and a target device to be connected is using the identification information included in the advertisement packet. When the user captures the target device to be connected using the camera, the photographed target device may be accurately identified to establish a connection.

For example, if there are several electronic devices having different models and similar appearances, accuracy of identification through estimation of the target device using machine learning may be significantly lowered. However, in the present invention, the photographed target device may be accurately recognized by combining the photographed information with the model ID included in the advertisement packet, thereby establishing a connection.

In addition, in embodiments of the present invention, the traditionally required operations of performing scanning by user operation of pressing the scanning button, displaying a list of scanned devices, and selecting a device to be connected by the user may be omitted. In addition, a process of displaying the list of scanned devices and selecting a model name from the list in a state in which the user knows the model names of the target devices may be omitted.

That is, instead of the existing complex and difficult method, a connection may be established by only capturing a device to be connected using a camera, thereby improving user convenience.

Meanwhile, the controller 180 may enable a connection with the first target device using a communication method corresponding to a service provided by the first target device.

Specifically, if the service provided by the first target device is enabled by a BLUETOOTH LE method, the controller 180 may perform the service using a previously established BLUETOOTH LE connection.

In contrast, if the service provided by the first target device is enabled by a communication method other than the BLUETOOTH LE method, the controller 180 may perform handover to an alternative communication element in order to perform the service.

As described above, the terminal 100 may acquire information on an alternative communication element (e.g., BLUETOOTH BR/EDR, Wi-Fi, Wi-Fi Direct, etc.) supported by the plurality of target devices through BLUETOOTH LE and information on a service (e.g., BLUETOOTH BR/EDR A2DP HFP, Wi-Fi Direct Miracast, Wi-Fi Direct File Transfer, etc.) capable of being provided through the alternative communication element.

In a state in which the first target device is connected through BLUETOOTH LE, the controller 180 may request enabling of an alternative communication element to be connected and a service from the first target device.

Specifically, if a specific service provided by the first target device is supported by BLUETOOTH BR/EDR (Basic Rate/Enhanced Data Rate), the controller 180 may perform handover from BLUETOOTH LE to BLUETOOTH BR/EDR.

More specifically, if a BLUETOOTH LE connection between the terminal 100 and the first target device is established, the terminal 100 and the first target device may enter a connection state.

In addition, the terminal 100 may transmit a read request for requesting additional information to the first target device if additional information is necessary. The read request is a message for requesting information stored in the GATT database of the first target device.

In addition, the terminal may receive a read response from the first target device in response to the read request. Therefore, the terminal may receive the requested additional information.

Thereafter, the terminal 100 may transmit a write request message to the first target device in order to request ON of BLUETOOTH BR/EDR which is alternative communication technology to be connected and enabling of the service.

The write request is a message for requesting writing of the handover control point property of the GATT database of the first target device. At this time, the terminal 100 may request enabling of some or all of the services supportable by the first target device through the write request.

The first target device, which has received the write request message, may enter a BR/EDR page scan state. In addition, the terminal may receive a write response from the first target device in response to the write request.

The first target device turns on BLUETOOTH BR/EDR which is an alternative communication element and enables the service according to the request of the terminal 100. At this time, the first target device may enable some or all of the services requested by the terminal.

In addition, the terminal, which has received the write response message, may enter the BR/EDR page state, transmit a page message to the first target device and establish a BLUETOOTH BR/EDR connection.

Thereafter, the terminal and the first target device may provide services through BLUETOOTH BR/EDR.

Meanwhile, if a specific service provided by the first target device is supported by Wi-Fi Direct, the controller 180 may perform handover from BLUETOOTH LE to Wi-Fi Direct.

More specifically, if a BLUETOOTH LE connection between the terminal 100 and the first target device is established, the terminal 100 and the first target device may enter the connection state.

In addition, the terminal 100 may transmit a read request for requesting additional information to the first target device if additional information is necessary. The read request is a message for requesting information stored in the GATT database of the first target device.

In addition, the terminal may receive a read response from the first target device in response to the read request. Therefore, the terminal may receive the additional information requested by the terminal.

Thereafter, the terminal 100 may transmit a write request message to the first target device in order to request ON of Wi-Fi Direct which is alternative communication technology to be connected and enabling of the service.

The write request is a message for requesting writing of the handover control point property of the GATT database of the first target device. At this time, the terminal 100 may request enabling of some (e.g., Miracast) or all of the services supportable by the first target device through the write request.

The first target device, which has received the write request message, may enter a listen state of Wi-Fi Direct.

In addition, the terminal may receive a write response from the first target device in response to the write request.

The first target device turns on Wi-Fi Direct which is an alternative communication element and enables the service according to the request of the terminal 100. The first target device may enable some or all of the services requested by the terminal.

Meanwhile, the terminal, which has received the write response message, may enter the search state of Wi-Fi Direct, transmit a probe request message to the first target device and establish a Wi-Fi Direct connection.

Thereafter, the first device 200 and the second device 300 may provide services through Wi-Fi Direct.

Figure 12:
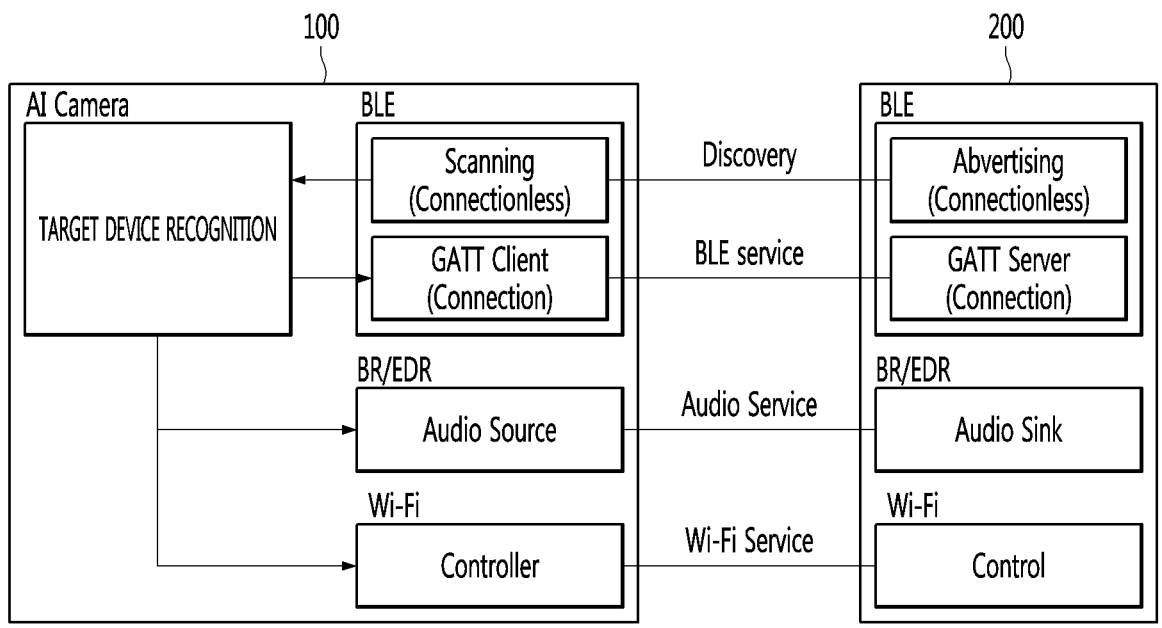
FIG. 12 is a diagram showing a terminal 100 and a first target device according to an embodiment of the present invention.
Figure 13:
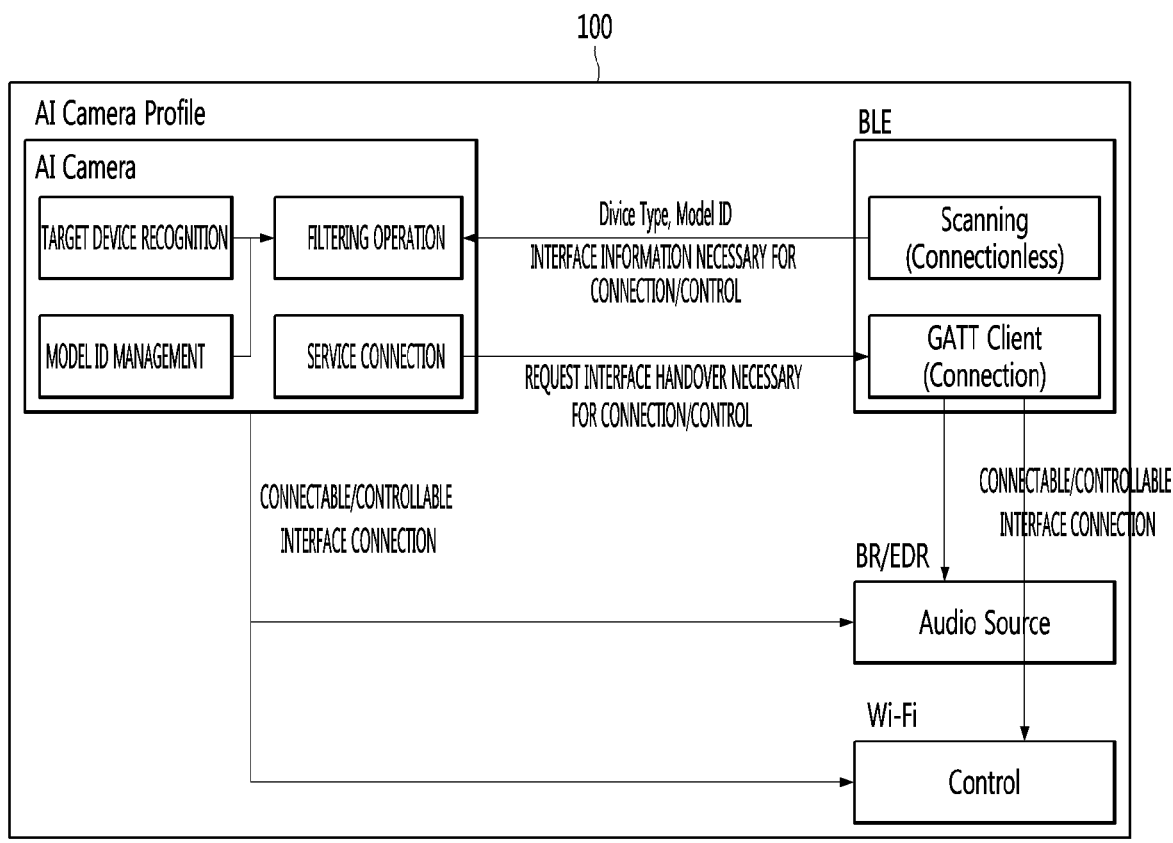
FIG. 13 is another diagram showing a terminal 100 according to an embodiment of the present invention.

FIG. 12 is a diagram showing a stack of the terminal 100 and the first target device 200, and FIG. 13 is a diagram showing a detailed stack of the terminal 100.

In order to discover neighboring device supporting BLUETOOTH LE, the terminal may perform scanning and receive advertisement information from a target device.

Meanwhile, information on the network interface for providing a service (that is, necessary for connection and control) or a model ID may be acquired from the advertisement information.

In addition, the terminal may manage the model ID, recognize the target device from the photographed image, and filter scanned target devices. Therefore, a target device to be connected may be determined.

Meanwhile, the GATT client of the terminal may request information stored in the GATT database from the GATT server of the target device, and the GATT server may provide a service provided by the target device and the network interface for providing the service to the GATT Client.

The terminal may acquire the network interface for connection and control of the determined target device.

If the network interface for connection and control of the target device is not BLUETOOTH LE, handover may be requested.

In addition, the terminal may be connected to the target device using the network interface, handover of which has been requested, thereby providing content such as audio to the target device or controlling the target device.

Figure 14:
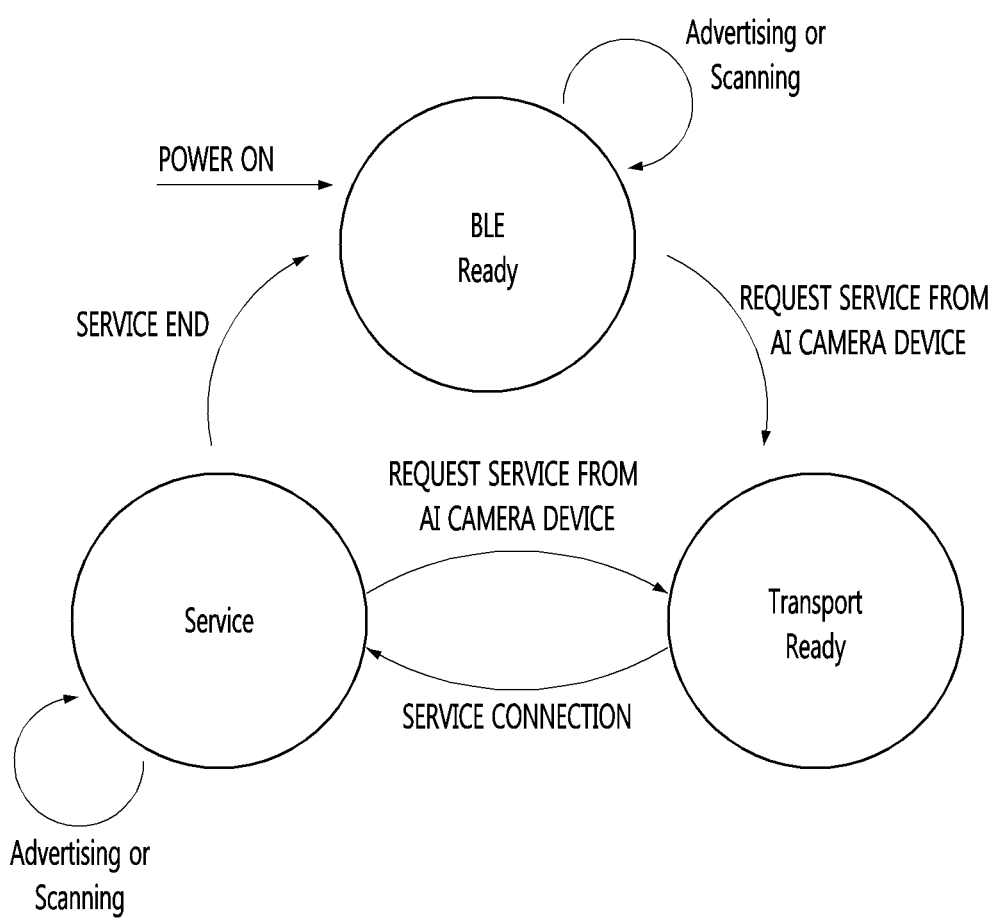
FIG. 14 is a diagram showing state change of a target device according to an embodiment of the present invention.
Figure 15:
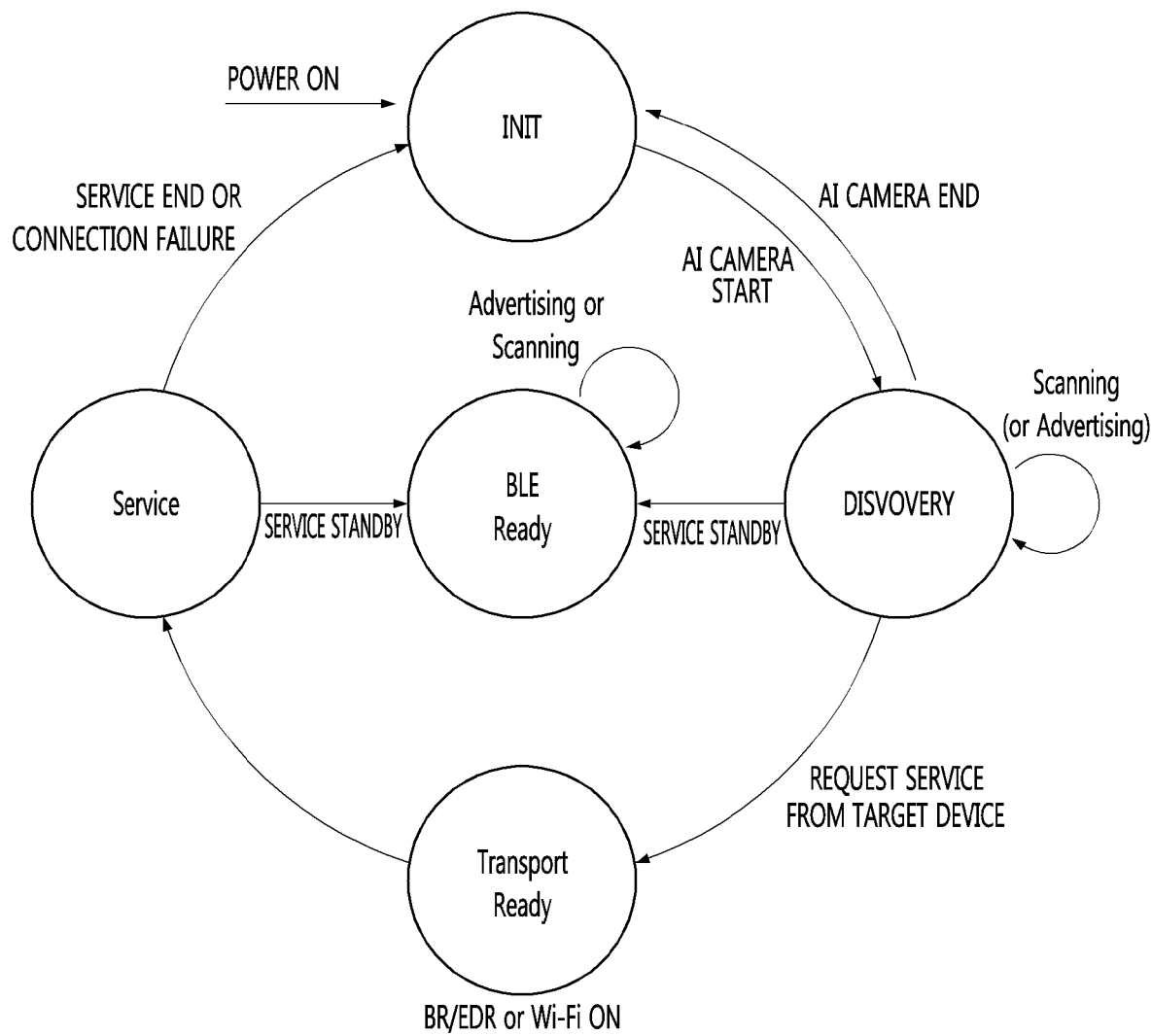
FIG. 15 is a diagram showing state change of a terminal according to an embodiment of the present invention.

FIG. 14 is a diagram showing state change of the target device, and FIG. 15 is a diagram showing state change of the terminal.

Referring to FIG. 14, if the target device is powered on, the target device enters a BLE Ready state. In this state, BLE may transmit an advertisement packet to the terminal.

In this case, the terminal (AI camera device) may scan a target device in the BLE Ready state and acquire Model ID information included in the advertisement packet through the scanned result.

If a service request is received from the terminal (AI camera device), the target device enters a Transport Ready state. In addition, the target device may turn on Transport capable of performing a corresponding service and enable the Transport to enter a connection standby state.

The target device enters a service state to perform a service requested by a seeker. At this time, BLE continuously performs advertising according to a request of the terminal (AI camera device). The terminal (AI camera device) may scan a target device in the service state.

If the service ends, the target device enters the BLE Ready state.

Referring to FIG. 15, if the terminal (AI camera device) is powered on, the terminal may enter an initiating state.

When the camera operates, the terminal (AI camera device) transitions to a discovery state to perform scanning operation.

In some implementations, the terminal (AI camera device) may transition from the initiating state to the discovery state by another action (e.g., scan button selection, etc.) of the user to perform scanning operation.

In order to use a provider and a specific service, the terminal exchanges information on Transport (BR/EDR, Wi-Fi, ... ), through which a connection is established based on a BLE GATT connection, and information on a used service, and enters a Transport ready state.

The terminal turns on Transport capable of performing a service desired by the user in the Transport Ready state and enables the Transport to enter a connection standby state.

In addition, the terminal may perform the service in the Service state and enter the Initiating state when the service ends.

FIG. 16 is a diagram showing a process of establishing connection with the first target device 600 according to an embodiment of the present invention.

The process of scanning neighboring target devices by the terminal to generate the list of scanned target devices may be performed before or after the process of photographing the target device to estimate the identification information of the target device.

For example, the terminal may first photograph the target device to estimate the identification information of the target device and then scan the neighboring target devices to generate the list of scanned target devices.

In another example, the terminal may scan the neighboring target devices to generate the list of scanned target devices and then photograph the target device to estimate the identification information of the target device.

In order to reduce a time required for connection with the target device, it may be advantageous that the list of neighboring target devices is already generated when the identification information of the target device is estimated. However, when scanning is continuously performed for this purpose, power consumption may increase.

Accordingly, a method of minimizing a time required for connection with a target device while minimizing power consumption will be described.

Figure 16A:
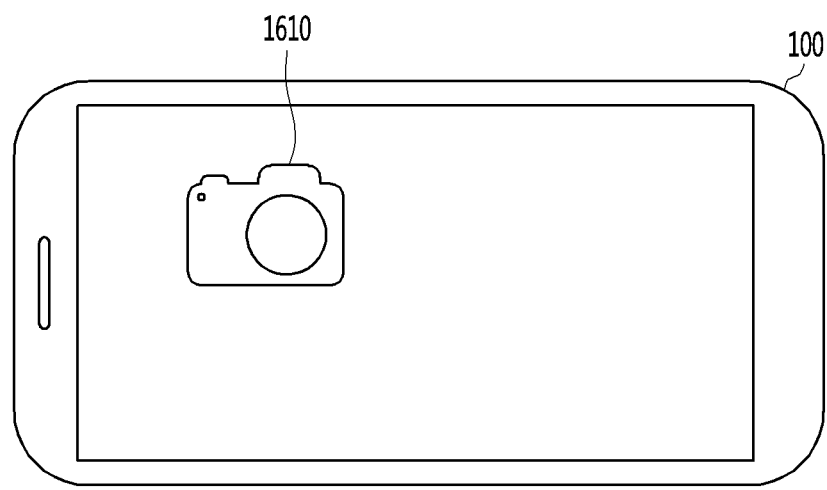

In FIG. 16A, the controller may display an icon 1610 for a BLUETOOTH LE connection.

In addition, if input of selecting the icon 1610 for the BLUETOOTH LE connection is received, the controller may enable the photographing function of the camera and scan neighboring target devices.

If the photographing function of the camera is enabled, as shown in FIG. 16B, the controller may display a preview screen 1620 indicating the image received through the camera.

In this case, the user may capture the first target device 600 to be controlled of the plurality of target devices. If the target device is included in the image received through the camera, the controller 180 may perform photographing to acquire the photographed image of the first target device. In this case, the controller 180 may automatically perform photographing even if user input of pressing the photographing button is not received.

Meanwhile, if a target device is included in the image received through the camera, the controller 180 may perform photographing at a predetermined time interval, thereby acquiring the photographed image of the first target device.

In this case, the controller 180 may perform photographing until a recognition rate becomes greater than a predetermined value based on the recognition rate determined by the machine learning model, to which the photographed image is input.

Meanwhile, in a state in which the photographing function of the camera is enabled, that is, in a state in which the preview screen 1620 is displayed, the controller may scan neighboring target devices. In addition, the controller may receive advertisement information from the plurality of target devices and generate a list of the plurality of target devices using the received advertisement information.

After the list of the plurality of target devices is generated, when the learned machine learning model estimates the identification information of the first target device and outputs the estimated identification information, the controller may acquire the first target device corresponding to the estimated identification information from the list.

That is, although enabling of the photographing function and scanning may be performed simultaneously with selection of the icon 1610, a time difference between enabling of the photographing function and actual photographing occurs. Accordingly, the list of scanned devices is first generated and then the estimated identification information is output. Accordingly, since the list of neighboring target devices is already generated when the identification information of the target device is estimated, it is possible to minimize a time required for connection with the target device.

In addition, the user may select the icon 1610 in order to connect BLUETOOTH LE. In addition, in the present invention, if the user selects the icon 1610, scanning is performed. Therefore, it is unnecessary to continuously perform scanning in order to generate the list of neighboring target devices in advance.

Figure 16C:
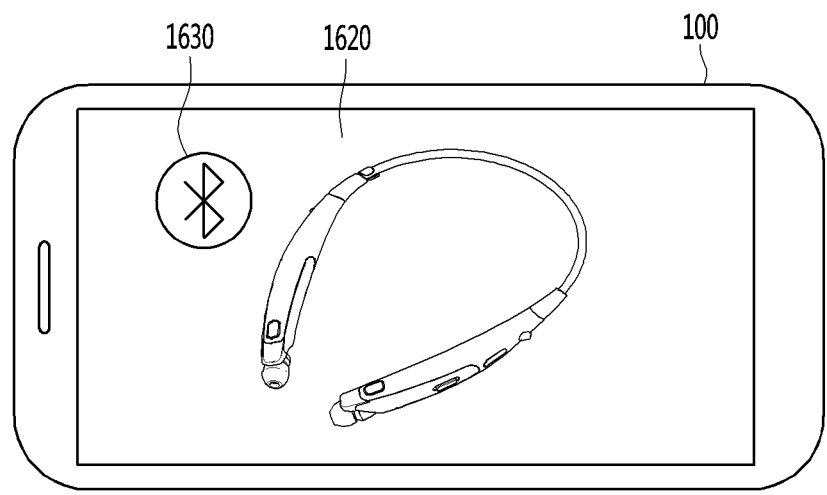

Meanwhile, if the first target device corresponding to the estimated identification information is acquired from the list, as shown in FIG. 16C, the controller may display a connection icon 1630 for connection with the first target device.

If input of pressing the connection icon 1630 is received, the controller may establish a connection between the terminal and the first target device.

Meanwhile, the connection established by selection of the connection icon 1630 is merely exemplary and the controller may automatically connect the terminal with the first target device without user input when the first target device corresponding to the estimated identification information is acquired from the list.

The controller may select a BLUETOOTH LE method or an alternative communication element according to the service provided by the first target device, thereby connecting the terminal with the first target device.

For example, if the first target device is a headset, the first target device may provide an audio service. In this case, the controller may transmit content stored in or reproduced on the terminal to the first target device after establishing a BR/EDR connection with the first target device.

In another example, if the first target device is a TV, the first target device may provide a control service or a Miracast service by the terminal. In this case, the controller may transmit a control command or the screen of the terminal to the first target device after establishing a Wi-Fi connection with the first target device.

In another example, if the first target device is a sensor, the first target device may provide a sensing information provision service acquired by the first target device. In this case, the controller may receive sensing information from the first target device after establishing a BLUETOOTH LE connection with the first target device.

FIG. 17 is a diagram showing a control icon corresponding to the function of a target device.

If a first target device 500 is included in a preview screen 1710, the controller may enable a connection with the first target device.

If the connection with the first target device is enabled, the controller may display control icons 1721, 1722 and 1723 on the preview screen 1710 corresponding to the functions of the first target device or an attribute icon capable of confirming the attributes of the first target device.

In this case, the controller may display the control icons or the attribute icon on the preview screen 1720.

For example, if the first target device is a humidifier, the controller may display an icon for turning on/off the humidifier, an icon for controlling the strength of the humidifier, an icon for confirming current humidity, and the like.

In this case, the terminal may transmit a control command to the first target device, and the first target device may transmit the sensing information to the terminal.

In embodiments of the present invention, if the connection between the terminal and the first target device is enabled, the control icon may be displayed without executing a dedicated application (App) for controlling the first target device, such that the user may directly control the first target device on the preview screen 1710.

That is, conventionally, a dedicated App of a device to be controlled had to be executed, thus it forced users to install and use various different applications, where it may be difficult to adapt to different user interfaces between dedicated Apps. However, in embodiments of the present invention, the terminal may easily control a connected target device without separately learning the control UX of each device.

FIG. 18 is a diagram illustrating a method of inputting a voice command using a terminal according to an embodiment of the present invention.

If a connection icon 1811 shown in FIG. 18A is selected, the controller may enable the camera function to display a preview screen 1810 and enable a connection with a first target device 200 included in the preview screen 1810.

Figure 18B:
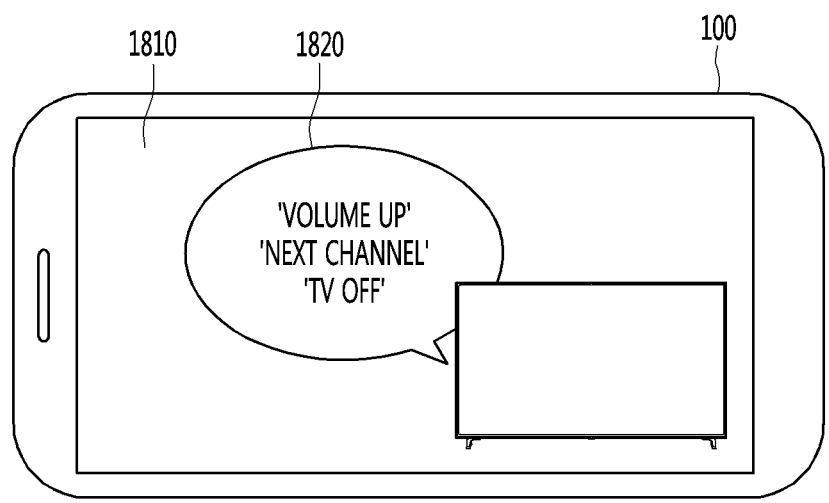

If the connection with the first target device 200 is enabled, as shown in FIG. 18B, the controller may display text of the voice command corresponding to the function of the first target device.

In this case, the controller may display the text of the voice command on the preview screen 1810.

In this case, voice commands frequently used by the user may be displayed on the screen. In addition, the text of the voice command based on information on currently reproduced content or the favorite channel of the user may be displayed.

Figure 18C:
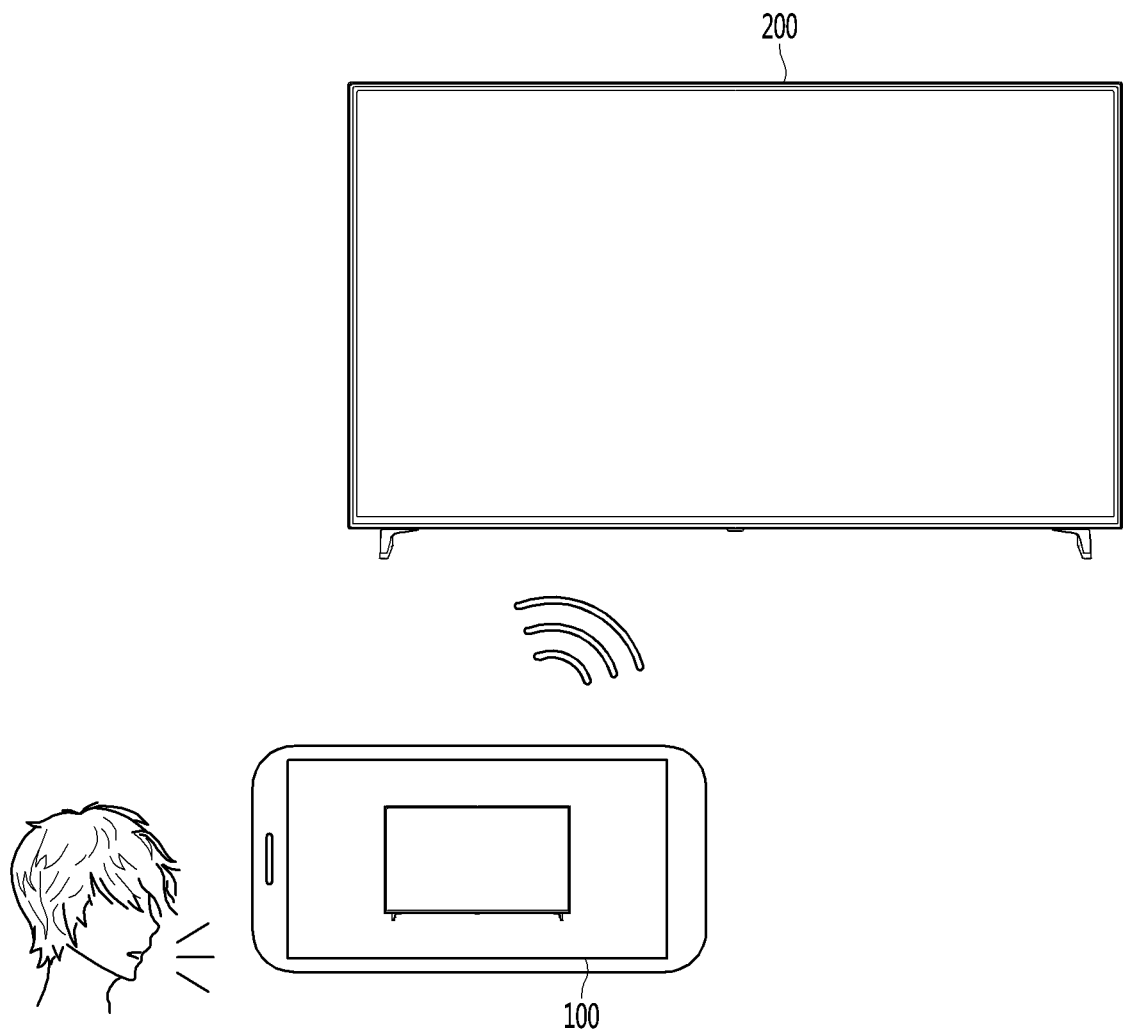

Meanwhile, as shown in FIG. 18C, the user may input the voice command to the terminal 100 or may directly input the voice command to the first target device 200.

If the voice command is input to the terminal 100, the terminal 100 may transmit the voice command to the first target device 200.

In embodiments of the present invention, since available voice commands may be visually displayed and the user needs to learn the voice commands, it is possible to improve user convenience.

The terminal described in this specification may include various devices, such as a mobile phone, a smartphone, a laptop, a digital broadcast terminal, a personal digital assistant (PDA), a portable multimedia player (PMP), a navigation system, a slate PC, a tablet PC, a laptop or convertible PC, an ultrabook, a wearable device such as a smartwatch, smart glasses or a head mounted display (HMD), and the like.

However, it will be readily apparent to those skilled in the art that the configuration according to the embodiment described in this specification is applicable to a fixed terminal such as a digital TV, a desktop computer or a digital signage, in addition to the terminal.

In addition, the target device described in the present invention may include a TV, a headset, a washing machine, a refrigerator, a speaker, an air purifier, an air conditioner, a humidifier, a denumidifier, an audio player, a sensor, various other home appliances, smart speakers, smart displays, and the like.

A method of receiving shape information from target devices and determining a photographed target device using the shape information will be described with reference to FIGS. 19 to 35.

Figure 19:
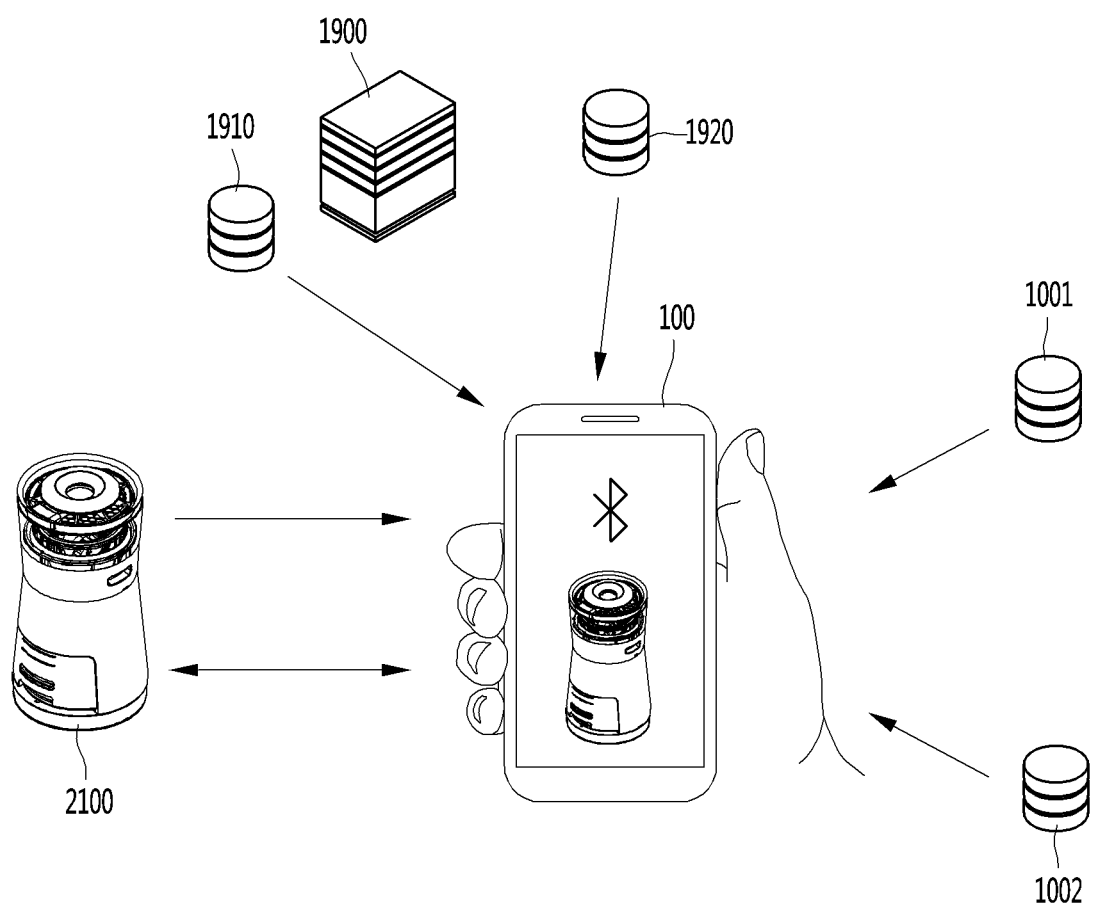
FIG. 19 is a diagram illustrating a wireless communication system according to another embodiment of the present invention.

FIG. 19 is a diagram illustrating a wireless communication system according to another embodiment of the present invention.

In the wireless communication system, a terminal 100, a plurality of target devices and a server 1900 may perform communication.

For the terminal 100 and the plurality of target devices, refer to the description of FIGS. 1 to 18C.

Meanwhile, the terminal 100 may communicate with the server 1900.

The server 1900 may include a first database 1910 and a second database 1920.

A detailed information list including the detailed information of the plurality of target devices may be stored in the first database 1910.

Here, the detailed information may include at least one of the shape information (shape ID) of the target device, model information (model ID), a supported alternative communication element (e.g., BLUETOOTH BR/EDR, Wi-Fi, Wi-Fi Direct, etc.), and type and distance estimation information of a providable service.

Meanwhile, a learned machine learning model may be stored in the second database 1920.

If the detailed information list is installed in the server 1900, the terminal may transmit at least one of the shape information and the model information received from the target device to the server 1900. In this case, the server 1900 may search the detailed information list using at least one of the received shape information and model information. In addition, the server 1900 may acquire and transmit detailed information corresponding to the received shape information and model information to the terminal.

In addition, if the trained machine learning model is installed in the server 1900, the terminal may photograph the first target device and transmit the photographed image to the server 1900. In this case, the server 1900 may input the photographed image to the learned machine learning model to acquire the estimated shape information of the first target device. In addition, the server 1900 may transmit the estimated shape information to the terminal.

The detailed information list and the trained machine learning model may be stored in the terminal instead of the server.

Specifically, the storage unit of the terminal 100 may include a first database 1001 and a second database 1002.

The detailed information list including the detailed information of the plurality of target devices may be stored in the first database 1001.

The learned machine learning model may be stored in the second database 1002.

If the detailed information list is installed in the terminal, the controller of the terminal may search the detailed information list using the shape information and model information received from the target device. The controller of the terminal may acquire detailed information corresponding to the received shape information and model information.

If the learned machine learning model is installed in the terminal, the controller of the terminal may photograph the first target device, input the photographed image to the learned machine learning model and acquire estimated shape information of the first target device.

Figure 20:
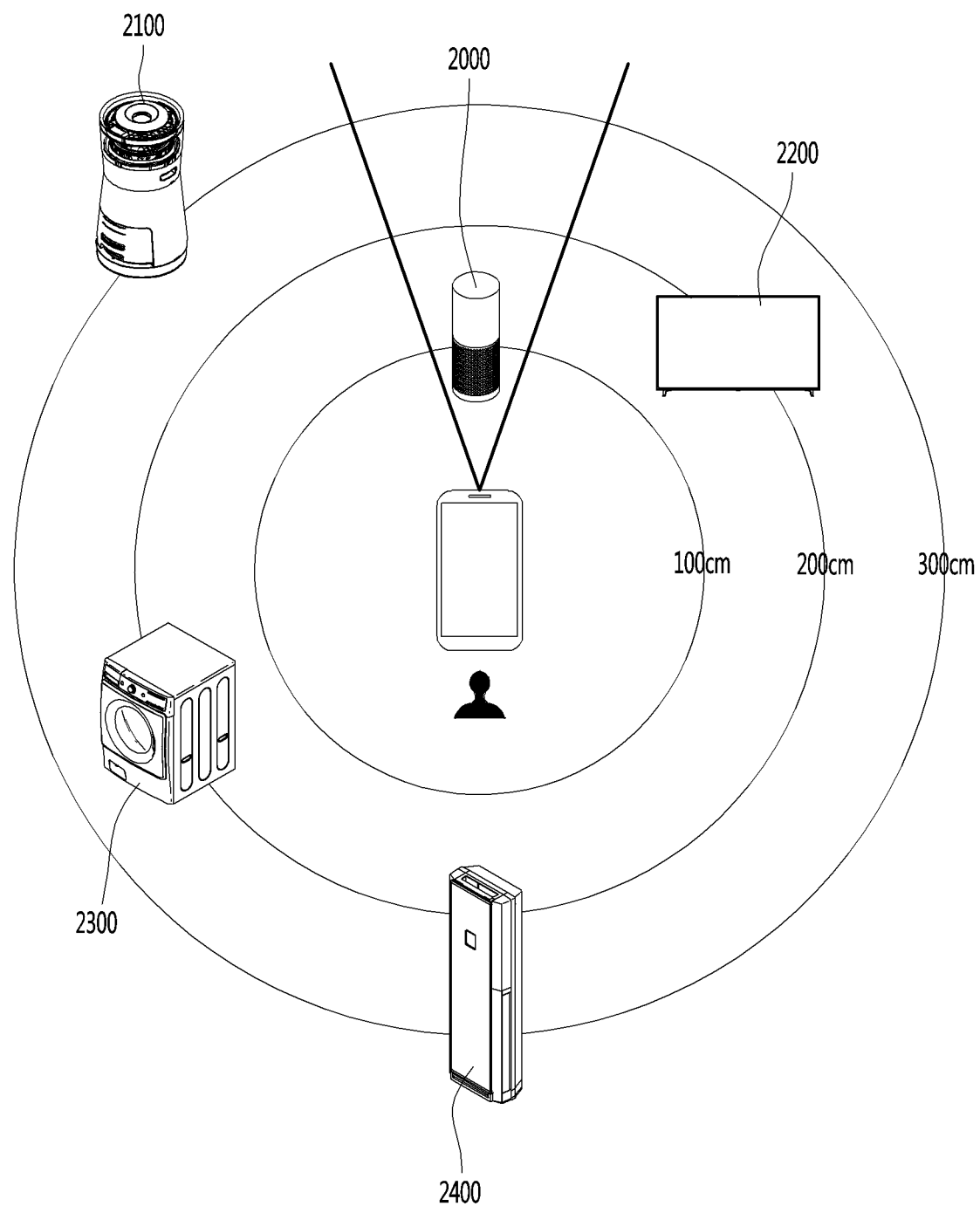
FIG. 20 is a diagram showing a terminal communicating with a plurality of target devices according to an embodiment of the present invention.

FIG. 20 is a diagram showing a terminal communicating with a plurality of target devices.

Referring to FIG. 20, the terminal may communicate with the plurality of target devices 2100, 2200, 2300 and 2400 in a communication range using a BLUETOOTH Low Energy (BLE) method.

In addition, if the user captures an image of a first target device 2000 to be controlled of the plurality of target devices, the controller may perform photographing to acquire the photographed image of the first target device 2000.

Figure 21:
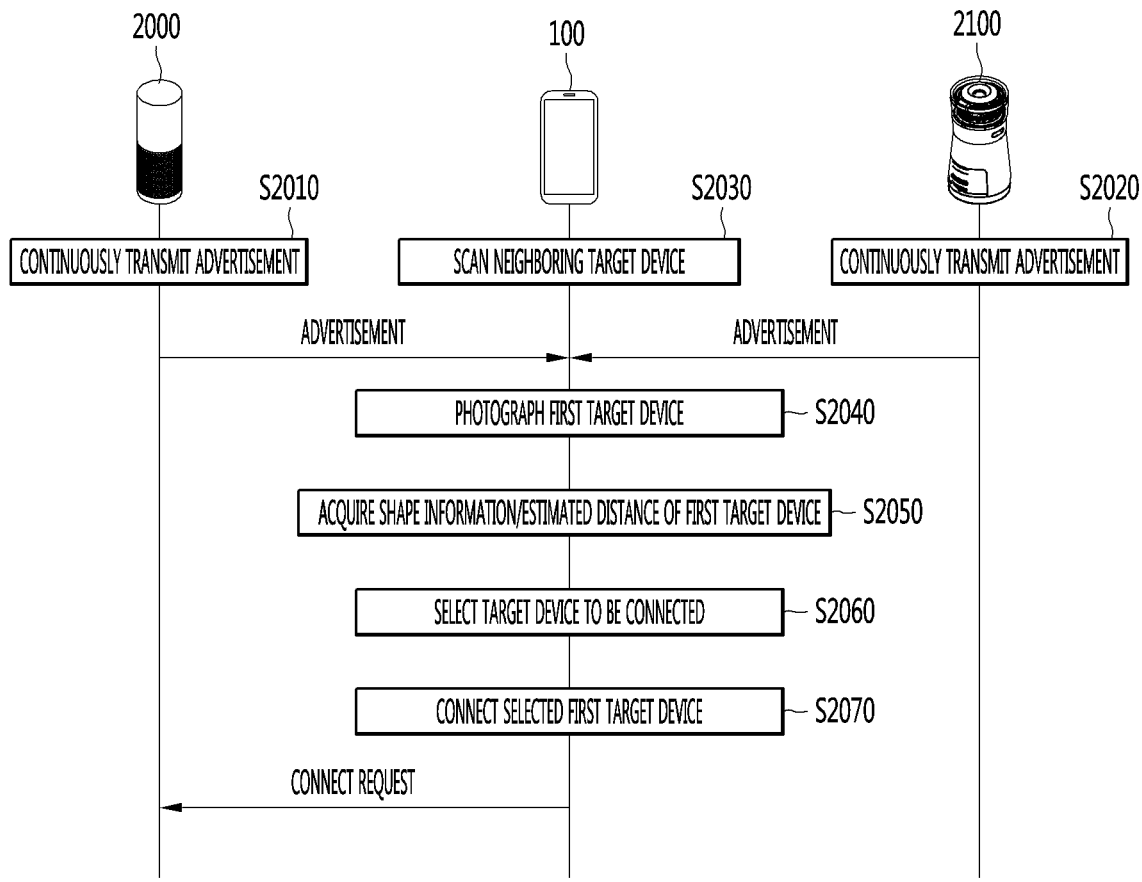
FIG. 21 is a diagram illustrating a method of operating a wireless communication system according to an embodiment of the present invention.

FIG. 21 is a diagram illustrating a method of operating a wireless communication system according to an embodiment of the present invention.

The plurality of target devices 2000 and 2100 may transmit advertisement information to the terminal 100 (S2010 and S2020).

In addition, the terminal 100 may scan neighboring target devices (S2030).

This will be described with reference to FIG. 22.

For example, the first target device 2000 will be described. The first target device 2000 in the advertising state may transmit advertisement information to neighboring devices for each advertisement event.

The terminal 100 may set a scanning parameter to perform scanning operation in order to receive an advertisement packet from neighboring devices in the standby state. In addition, the terminal 100 enters the scanning state in order to perform scanning operation, and receives advertisement packets from the neighboring devices during a scanning window duration. For example, the advertisement packets may be received from the plurality of target devices during the scanning duration of the terminal 100.

Figure 22:
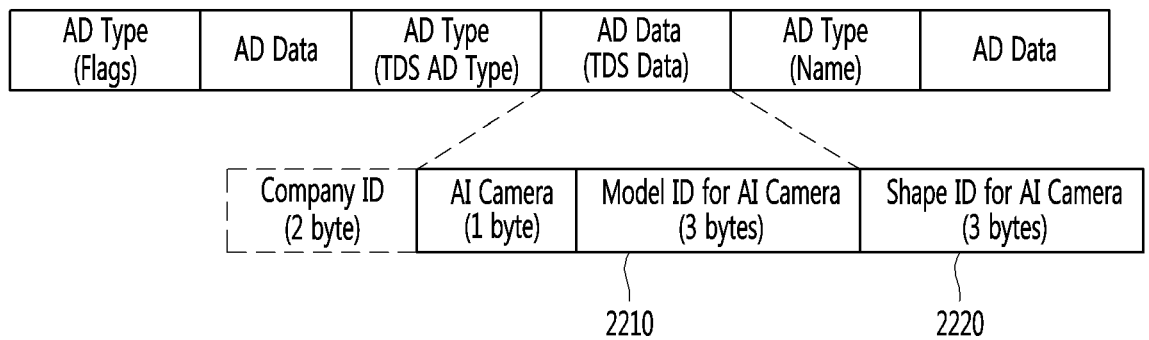
FIG. 22 is a diagram showing an example of the data format of an advertisement packet according to an embodiment of the present invention.

FIG. 22 is a diagram showing an example of the data format of an advertisement packet. Referring to FIG. 22, the advertisement packet has an AD structure, and the terminal 100 may parse the advertisement packet in order to find desired data.

Specifically, the plurality of target devices may include specific data in the advertisement packet in the AD structure through the above-described advertisement parameter setting procedure.

For example, the plurality of target devices may configure the advertisement packet in order to transmit transmission (Tx) power, TDS, data for providing distance estimation information, manufacturer information, which is information related to a manufacturer, through the advertisement packet.

The advertisement packet may be composed of a plurality of AD structures, and each AD structure may be composed of a length type value (LTV) structure.

A Length field may indicate the length of data, an Ad Type field may indicate the type of included data, and AD Data may include actual data.

That is, each AD structure may include the Length field, the AD Type field and the AD Data field.

Here, the AD type may indicate the type of the data included in AD Data. In addition, the AD Data field may include data according to AD Type, and may be composed of one or a plurality of LTV structures.

Meanwhile, the advertisement information transmitted by the target device may include model information 2210 of the target device. In addition, the model information of the target device may be the model ID of the target device.

For example, the advertisement information transmitted by the second target device 2100 may be the model ID of the second target device 2100 which is the model information of the second target device 2100.

In another example, the advertisement information transmitted by the first target device 2000 may be the model ID of the first target device 2000 which is the model information of the first target device 2000.

Here, the model ID may be a string obtained by combining aspects of the product, such as the function, color, appearance, product line, country, and the like, of the device, as a unique identifier created by the manufacturer to identify the device.

In this case, the plurality of target devices may include the model information of each of the plurality of target devices in the advertisement packet through the above-described advertisement parameter setting procedure.

In this case, the advertisement packet may include data indicating the model ID of the target device. Specifically, an extended field including data indicating the model ID of the target device may be configured using Manufacturer AD type. In this case, the extended field may include an AI camera field such that the terminal 100 recognizes that the target device is recognized through photographing, and may include a data field (Model ID for AI camera) indicating the model ID of the target device.

In addition, the advertisement information transmitted by the target device may include shape information 2220 of the target device. In addition, the shape information of the target device may be a shape ID of the target device.

For example, the advertisement information transmitted by the second target device 2100 may include the shape ID of the second target device 2100, which is the shape information of the second target device 2100.

In another example, the advertisement information transmitted by the first target device 2000 may include the shape ID of the first target device 2000, which is the shape information of the first target device 2000.

Here, the shape ID may be a unique identifier applied to a shape recognizable by the terminal, which has photographed the target device, if the target device is photographed.

In addition, the shape ID may indicate information for identifying the target device using the learned machine learning model, if the target device is photographed and the photographed image is input to the learned machine learning model.

In addition, the same shape ID may be given to even devices having different model IDs, if the machine learning model recognizes that the devices having different model IDs have the same shape.

For example, if a specific speaker having a first model ID has a cylindrical shape and a specific air purifier having a second model ID has a cylindrical shape, the same shape ID may be given to the specific speaker and the specific air purifier.

In this case, the plurality of target devices may include the model information of each of the plurality of target devices in the advertisement packet through the above-described advertisement parameter setting procedure.

In this case, the advertisement packet may include data indicating the shape ID of the target device. Specifically, an extended field including data indicating the shape ID of the target device may be configured using Manufacturer AD type. In this case, the extended field may include an AI camera field such that the terminal 100 recognizes that the target device is recognized through photographing, and may include a data field (Shape ID for AI camera) indicating the shape ID of the target device.

In addition, the advertisement information may include the access address of each of the plurality of target devices for accessing the plurality of target devices.

Meanwhile, the controller 180 may receive a plurality of pieces of advertisement information including the identification information of the plurality of target devices from the plurality of target devices.

Specifically, the terminal 100 is initially in the standby state. In the standby state, the terminal 100 may not receive a message.

In addition, in the standby state, the terminal 100 may enter the advertising state, the scanning state or the initiating state.

In order to scan a neighboring target device supporting BLUETOOTH in the standby state, the terminal 100 may perform scanning. In this case, the terminal 100 may enter the scanning state and receive the advertisement packet from the neighboring target device.

In this case, the controller 180 may parse the received advertisement packet and acquire the model ID, the shape ID and access address of the target device.

For example, the controller 180 may parse the advertisement packet received from the first target device 2000 and acquire the model information of the first target device 2000 (the model ID of the first target device 2000), the shape information of the first target device 2000 (the shape ID of the first target device 2000) and the access address.

Returning to FIG. 21, the controller 180 may control the camera to photograph the first target device of the plurality of target devices (S2040). In addition, the controller 180 may acquire the shape information, with which the first target device is labeled, using the photographed image of the first target device (S2050).

This will be described with reference to FIG. 7 showing the training process of the neural network and FIG. 23 showing a method of estimating shape information using a photographed image.

First, data for training of the neural network may be collected (S710). Here, the data is related to the plurality of target devices and may include the photograph, shape ID, etc. of each of the plurality of target devices.

Meanwhile, the collected data may be preprocessed (S720). Specifically, the collected data may be processed and classified into a state suitable for machine learning. In this case, an image format supported by a learning program, the number of data, data of each model, etc. may be classified/collected. In addition, the data may be classified and collected according to the shape ID. Here, the shape ID may correspond to the label of machine learning.

In addition, the collected data may be divided into training data and review data.

Meanwhile, the trained machine learning model may be generated by training the neural network using the training data in a machine learning manner (S730). Meanwhile, as the learning algorithm, Naive-Bayes, K-Nearest Neighbors, Logistic Regression, Support Vector Machine, etc. may be used in addition to the neural network.

Meanwhile, the training process of the neural network may be a process of labeling the image of the target device with shape information (shape ID) and performing training.

In order to improve a recognition rate, the images of the target device photographed at various angles and distances with various intensities of illumination may be used as training data, and images obtained by photographing a portion or the whole of the target device may be used as training data.

Meanwhile, the training process of the neural network may be a process of labeling the image of each of the plurality of target devices with shape information (shape ID) and performing training.

The machine learning model generated by training may be a model trained by labeling each of the plurality of target devices with shape information. If an image including a target device is input, the trained machine learning model may estimate and output the shape information (shape ID), with which the target device is labeled.

If learning ends, the result learned using the review data, that is, the trained machine learning model, is confirmed (S740), and, if accuracy of the result of review exceeds a target value, the trained machine learning model may be installed in the terminal 100 (S750).

In this case, a program for implementing the machine learning model may be stored in the storage unit.

Referring to FIG. 23A, the controller 180 may photograph the first target device. In addition, if the photographed image of the first target device is acquired, the controller 180 may estimate the shape information of the first target device.

Specifically, the controller 180 may input the photographed image of the first target device to the trained machine learning model. In this case, the trained machine learning model may estimate the shape information of the first target device using the input image and output the estimated result. That is, the controller 180 may input the photographed image to the trained machine learning model to acquire the estimated shape information.

In addition, the controller may acquire the estimated distance from the first target device using the photographed image of the first target device.

An example of calculating the estimated distance from the first target device using the photographed image of the first target device will be described with reference to FIG. 24.

FIG. 24 is a diagram illustrating an example of a method of acquiring a distance from a target device according to an embodiment of the present invention.

The controller 180 may receive input of the height H of the terminal from the user.

In addition, the controller 180 may recognize the floor in the photographed image of the first target device and recognize a distance from the first target device located on the floor. In addition, the controller 180 may calculate an angle (X degrees) between the terminal and the floor, on which the first target device is located, using a direction sensor.

In addition, the controller 180 may calculate a distance from the first target device using the acquired data.

Meanwhile, the description of FIG. 24 is merely exemplary and all methods of calculating the distance from the target device using the image, including time of flight information, may be used.

Meanwhile, the distance between the terminal 100 and the target device may be defined as distance_0.

Returning to FIG. 23, according to the above-described methods, the controller may estimate the shape ID of the first target device and the distance between the first target device and the terminal using the photographed image of the first target device.

If the shape information of the first target device and the distance from the first target device are estimated, as shown in FIG. 23b, the controller may generate estimated result information.

Returning to FIG. 21, the controller 180 may select a target device to be connected with the terminal 100 from among the plurality of scanned target devices (S2060). In addition, the controller 180 may enable a connection with the selected first target device (S2070).

Specifically, the controller 180 may select the first target device of the plurality of target devices as a target device to be connected with the terminal 100 using the photographed image of the first target device, the plurality of pieces of advertisement information received from the plurality of target devices and the distances from the target devices.

Assume that the terminal 100 receives the advertisement information of the first target device, the advertisement information of the second target device, the advertisement information of the third target device, by scanning the first target device, the second target device and the third target device.

In addition, assume that the first target device is photographed, the photographed image of the first target device is input to the machine learning model, and the machine learning model estimates the target device in the image as the first target device and outputs the shape information of the first target device.

The controller 180 may input the photographed image to the machine learning model to estimate the shape information of the target device included in the photographed image.

Specifically, if the machine learning model is installed in the terminal, the controller 180 may input the photographed image to the machine learning model stored in the terminal to estimate the shape information of the target device included in the photographed image. In addition, if the machine learning model is installed in the server, the controller 180 may transmit the photographed image to the server. In this case, the server may input the photographed image to the machine learning model stored in the server to estimate the shape information of the target device included in the photographed image. In addition, the controller 180 may receive the estimated shape information from the server.

Meanwhile, since the first target device is photographed, the machine learning model may determine that the target device included in the photographed image is the first target device, and output the shape information of the first target device.

In addition, since the first target device is photographed, the controller may calculate the estimated distance from the first target device using the photographed image.

If the plurality of target devices is scanned and the plurality of pieces of advertisement information is received, the controller 180 may generate a list of the plurality of scanned target devices using the plurality of pieces of advertisement information.

For a target device which does not support the target device recognition service using photographing, shape information (shape ID) may not be included in advertisement information.

Accordingly, the controller 180 may generate a list of target devices, which has transmitted advertisement information including shape information (shape ID). That is, the controller may generate a target device list including the shape information (shape ID) of the first target device and the shape information (shape ID) of the second target device.

The controller 180 may acquire the distances from the target devices, which have transmitted the advertisement information.

Specifically, if the target device transmits advertisement information, the controller 180 may calculate the distance from the target device using the strength of the signal received from the target device, for example, a received signal strength indication (RSSI).

For example, the controller may acquire a first distance from the first target device using the strength of the signal received from the first target device. In addition, the controller may acquire a second distance from the second target device using the strength of the signal received from the second target device.

Meanwhile, a log distance path loss model may be used through a method of calculating a distance using a received signal. The present invention is not limited thereto and all methods of calculating the distance using the received signal may be used.

Meanwhile, the transmission power Tx_Power of a wireless signal may differ between target devices.

Accordingly, the controller may acquire the transmission power Tx_Power of the wireless signals of the plurality of target devices, and calculate the distances from the plurality of target devices using the strength of the signals received from the plurality of target devices and the transmission power Tx_Power corresponding to the plurality of target devices.

Specifically, the plurality of target devices may transmit advertisement information including the transmission power Tx_Power of the wireless signals to the terminal.

For example, the first target device may transmit advertisement information including the shape information of the first target device and the transmission power Tx_Power of the first target device to the terminal.

In addition, the second target device may transmit advertisement information including the shape information of the second target device and the transmission power Tx_Power of the second target device to the terminal.

In this case, the controller 180 may acquire the first distance from the first target device using the strength of the signal received from the first target device and the transmission power of the first target device.

In addition, the controller 180 may acquire the second distance from the second target device using the strength of the signal received from the second target device and the transmission power of the second target device.

Meanwhile, the controller may enable a connection with the first target device using the estimated shape information, the estimated distance, the shape information included in the plurality of pieces of advertisement information and the distances from the target devices.

Specifically, assume that the shape information estimated using the photographed image is first shape information and a distance estimated using the estimated image is 1 m.

In addition, assume that first shape information is included in the advertisement information transmitted by the first target device, and the first distance from the first target device calculated using the strength of the signal received from the first target device is 1.1 m.

In addition, assume that first shape information is included in the advertisement information transmitted by the second target device, and the second distance from the second target device calculated using the strength of the signal received from the second target device is 2.0 m.

In addition, assume that second shape information is included in the advertisement information transmitted by the third target device.

Since the estimated shape information is the first shape information and the first shape information is received from the first target device and the second target device, the controller may enable a connection with any one of the first target device and the second target device. In addition, the controller may enable a connection with the first target device based on proximity to the estimated distance.

Specifically, the first distance (1.1 m) is closer to the estimated distance (1 m) than the second distance (2 m). Accordingly, the controller may enable a connection with the first target device.

In this case, the controller 180 may transmit the connect request to the first target device. In this case, the access address included in the advertisement information transmitted by the first target device may be used.

Recently, technologies for identifying a subject using an AI camera have appeared. However, these technologies may only identify the type of the subject (a washing machine, a refrigerator, etc.), but may not accurately identify the model of the target device.

However, in embodiments of the present invention, the identity of a target device is estimated using machine learning and a target device to be connected is determined using the shape information included in the advertisement packet. When the user only captures the target device to be connected using the camera, the photographed target device may be accurately identified to establish a connection.

For example, if there are several electronic devices similar appearances, accuracy of identification through estimation of the target device using machine learning may be significantly lowered. However, in the present invention, the photographed target device may be accurately identified using estimation of the distance using the image and calculation of the distance using the strength of the signal along with the shape ID, thereby establishing a connection.

FIG. 25 is a diagram showing a list of detailed information according to an embodiment of the present invention.

The controller may acquire the detailed information of the target device using the advertisement information received from the target device.

Specifically, if the detailed information list 2510 including the detailed information of the plurality of target devices is installed in the terminal, the controller may search the detailed information list stored in the storage unit to acquire detailed information corresponding to the received advertisement information.

In addition, if the detailed information list including the detailed information of the plurality of target devices is installed in the server, the controller 180 may transmit the received advertisement information to the server. In this case, the server may search the detailed information list to acquire detailed information corresponding to the received advertisement information. In addition, the controller 180 may receive the searched detailed information from the server.

Meanwhile, the detailed information may include a communication element supported by the target device, the type of a service provided by the target device or distance estimation information (transmission (Tx) power).

Accordingly, if the detailed information is searched for, the terminal may establish a connection with the target device using the communication element supported by the target device and provide the service supported by the target device.

Meanwhile, assume that the advertisement information does not include shape information but includes only model information.

If only the model information is received, the terminal searches the list including the detailed information of the plurality of target devices to find matched detailed information. Accordingly, search may be inefficient and slow.

FIG. 26 is a diagram illustrating a problem when advertisement information does not include model information but includes only shape information.

If first shape information (0x01) is received from the first target device (speaker) and second shape information (0x01) is received from the second target device (air purifier), the detailed information shown in FIG. 26 is searched for from the list including the detailed information of the plurality of target devices.

Accordingly, detailed information to be selected by the terminal may not be specified.

In order to solve such a problem, as shown in FIG. 27, the advertisement information may include model information in addition to shape information.

In FIG. 27, the list of the advertisement information received from three target devices is shown.

First advertisement information including first shape information 0x01, first model information P5570 and the address of the first target device was received from the first target device.

In addition, second advertisement information including first shape information 0x01, second model information L220 and the address of the second target device was received from the second target device.

In addition, third advertisement information including first shape information 0x02, third model information M7780 and the address of the third target device was received from the third target device.

Figure 28:
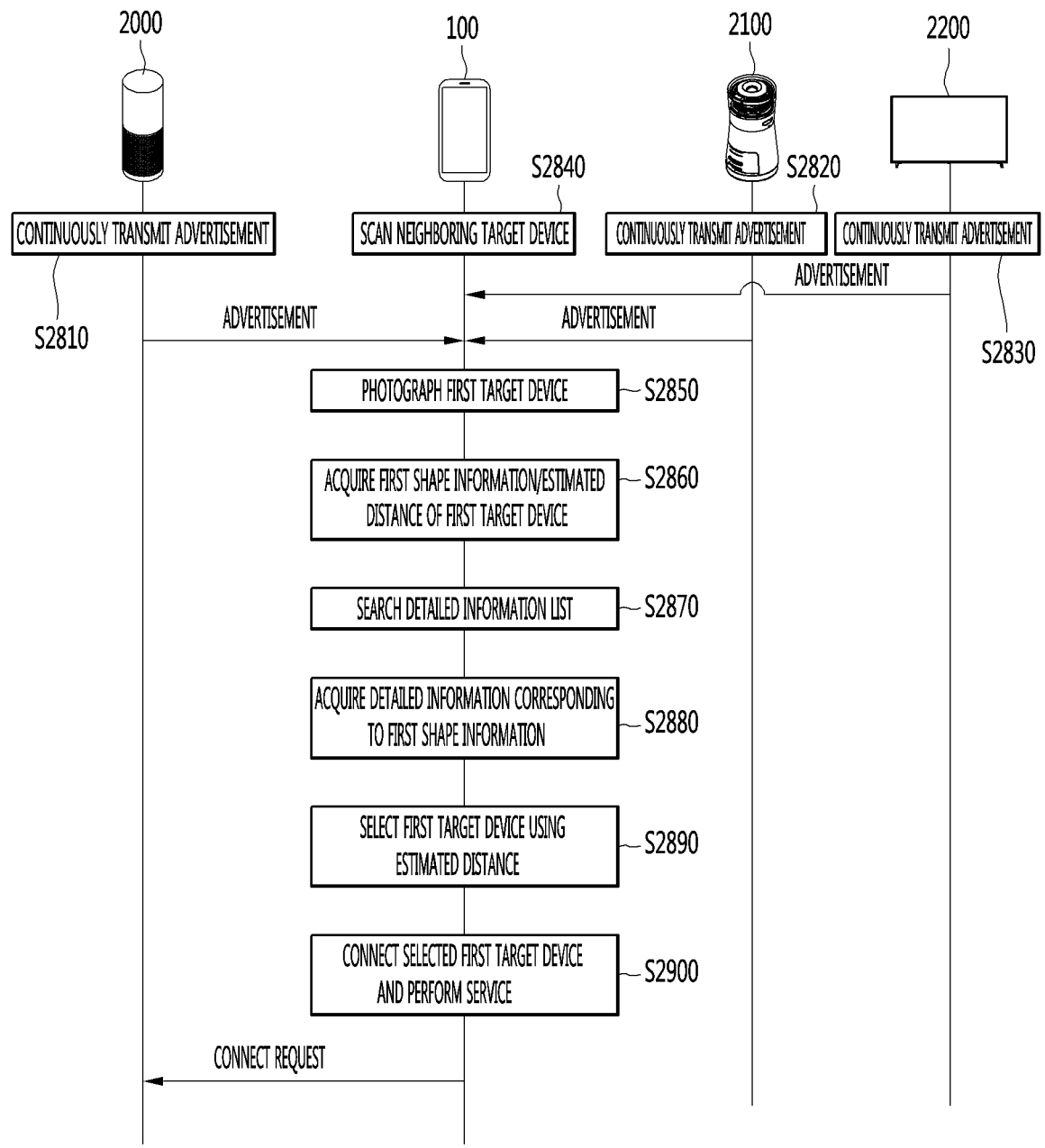
FIG. 28 is a diagram illustrating a method of operating a wireless communication system according to an embodiment of the present invention.

FIG. 28 is a diagram illustrating a method of operating a wireless communication system according to an embodiment of the present invention.

FIG. 29 is a diagram showing a detailed information list.

FIGS. 30 and 31 are diagrams showing a list of searched detailed information.

S2810, S2820, S2830, S2840, 2850 and S2860 are equal to the above description and thus a detailed description thereof will be omitted.

The peripheral device list shown in FIG. 27 is currently generated by scanning performed by the terminal.

Meanwhile, the controller may search the detailed information list using the received shape information and model information (S2870) and acquire detailed information corresponding to the received shape information and model information.

First, the controller may acquire detailed information corresponding to the shape information received using the received shape information.

Specifically, since the first target device transmits the first shape information 0x01, the second target device transmits the first shape information 0x01, and the third target device transmits the second shape information 0x02, the controller may preferentially search for detailed information 2910, 2920, 2930 and 2940 including the first shape information and the second shape information from the detailed information list 2510.

Then, the controller may search for the first detailed information 2910 corresponding to the first model information P5570 and the second detailed information 2920 corresponding to the second model information L220 from the detailed information 2910 and 2920 corresponding to the first shape information 0x01 using the received model information. In addition, the controller may acquire the third detailed information 2930 corresponding to the third model information M7780 from the detailed information 2930 and 2940 corresponding to the second shape information 0x02 using the received model information.

Meanwhile, since the first target device has been photographed, the machine learning model has estimated the first shape information 0x01.

Accordingly, the controller may acquire the detailed information 2910 and 2920 corresponding to the estimated first shape information 0x01 of the acquired detailed information 2910, 2920 and 2930 (S2880). The detailed information 2910 and 2920 corresponding to the first shape information 0x01 is shown in FIG. 30.

Meanwhile, the distance estimated using the photographed image is 1 m, the first distance from the first target device calculated using the strength of the signal received from the first target device is 1.1 m, and the second distance from the second target device calculated using the strength of the signal received from the second target device is 2.0 m.

Meanwhile, although the transmission power of the first target device and the transmission power of the second target device are respectively received from the target devices, the present invention is not limited thereto and the transmission power may be extracted from the detailed information list 2510. For example, if the first identification information and the first model information are received from the first target device, the controller may acquire detailed information corresponding to the first identification information and the first model information. In addition, the detailed information corresponding to the first identification information and the first model information may include the transmission power of the first target device.

That is, since the estimated distance is close to the first distance, the controller may select the first target device as a target device to be connected.

In this case, the controller may select the detailed information 2910 corresponding to the first model information P5570 received from the first target device. The finally searched detailed information 2910 is shown in FIG. 31.

Meanwhile, the controller may acquire the communication element and service provided by the first target device through the searched detailed information 2910, connect the terminal with the first target device using the communication element provided by the first target device, and then provide the service.

For example, if the first target device is a speaker, the communication element provided by the first target device may be BLUETOOTH and the service provided by the first target device may be a speaker service.

In this case, the controller may transmit content, which is stored in the terminal or is being reproduced, to the first target device through BLUETOOTH (BT).

Figure 32:
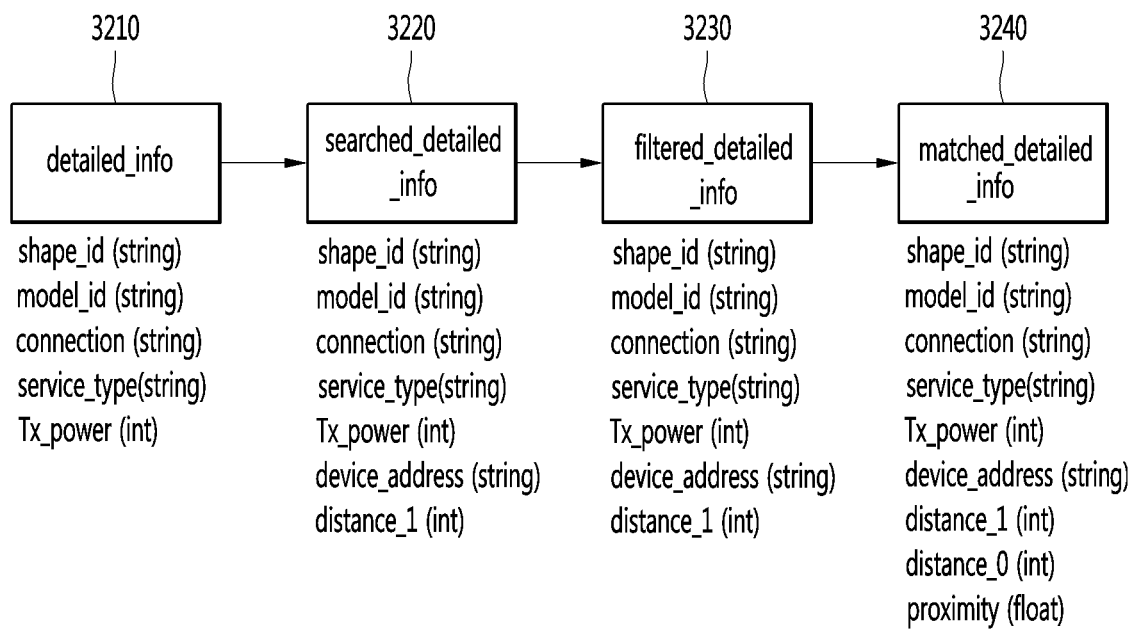
FIG. 32 is a diagram showing information included in a detailed information list and information acquired by a controller according to an embodiment of the present invention.

FIG. 32 is a diagram showing information included in a detailed information list and information acquired by a controller according to an embodiment of the present invention. FIG. 29 will also be referred to.

The detailed information list may include detailed information 3210 including shape information, model information, a connection method, a service type and transmission power. Meanwhile, if the shape information and the model information are received from the target device, the controller may search for the detailed information 3220 corresponding to the received shape information and model information. In addition, the searched detailed information may further include address information included in the advertisement information and distance information calculated using the strength of the received signal. The detailed information corresponding to the received advertisement information may be acquired in this manner.

Meanwhile, the controller may select the detailed information 3230 corresponding to the estimated shape information.

In addition, the controller may acquire the detailed information 3240 of a target device closer to the terminal. In this case, the detailed information 3240 may further include distance information distance_1 between the terminal and the target device, the estimated distance distance_0 from the photographed target device, and proximity proximity_0 between the terminal and the target device.

According to embodiments of the present invention, there are many steps of connecting the target device with the terminal and providing a service. However, when the target device is captured by the camera, a connection is immediately established to provide a service (sound transmission of the terminal and sound output of the target device), thereby providing a best service to the user.

In the present invention, information on the connection method and the service is acquired in advance using the shape information and the model information, thereby significantly shortening a time required for connection and service provision.

For example, when the user selects an icon 1610 for BLUETOOTH LE connection of FIG. 16A, the terminal performs scanning. This process may be finished before the machine learning model estimates the shape information after the user performs photographing. In addition, since the detailed information corresponding to the model information and the shape information is searched for in advance, the number of objects to be compared with the estimated shape information is significantly reduced. Therefore, the present invention may significantly reduce a time required to provide the service after the user captures the target device.

Figure 33:
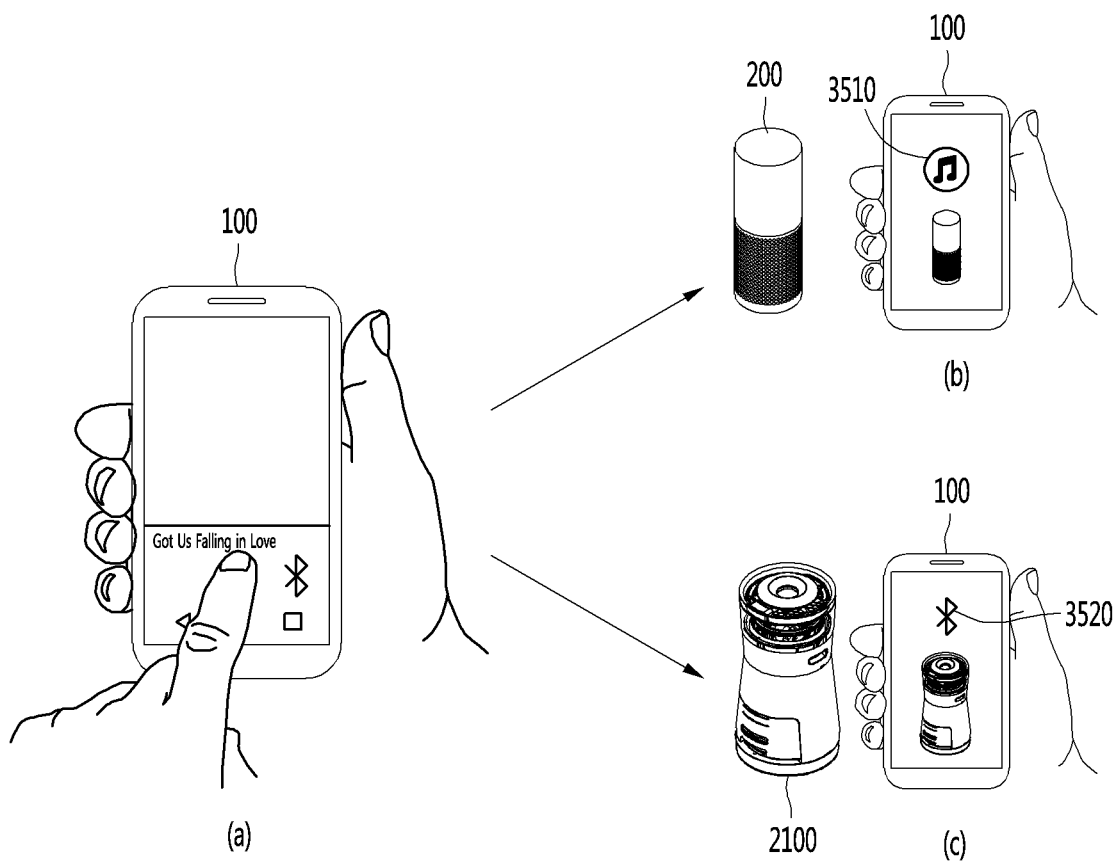
FIG. 33 is a view illustrating a method of establishing a connection with a target device according to the embodiment of the present invention.

FIG. 33 is a view illustrating a method of establishing a connection with a target device according to the embodiment of the present invention.

If input of establishing a connection with a target device is received while a specific application is executed and a service provided by the first target device supports a specific application, the controller may establish a connection with the first target device and provide a service without separate input.

For example, as shown in FIG. 33A, assume that an icon for a BLUETOOTH LE connection is selected while a music application is executed.

As shown in FIG. 33B, if the first target device determined as the target device to be connected is a speaker 2000, the speaker 2000 may support the music application to output music.

In this case, the controller may establish a connection with the speaker 2000 without separate input and immediately transmit content for providing a sound output service. In this case, the speaker 2000 may also output sound without separate input. In addition, the controller may display a handover icon 3510 indicating that handover has been performed.

In contrast, as shown in FIG. 33C, if the first target device determined as the target device to be connected is an air purifier 2100, the air purifier 2100 may not output music through the music application.

In this case, the controller may display a connection icon 3520. When input of selecting the connection icon 3520 is received, the controller may control a communication unit to establish a connection with the air purifier.

The invention may also be embodied as non-transitory computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. The computer may include the controller 180 of the terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A terminal comprising:
a communication interface configured to communicate using a short-range wireless protocol;
a camera; and
one or more processors configured to:
receive advertisement information including shape information and distance information from a plurality of target devices;
control the camera to photograph a selected target device of the plurality of target devices;
input a photographed image of the selected target device to one or more trained machine learning models to obtain estimated shape information of the selected target device;
obtain an estimated distance from the selected target device based on the photographed image; and
establish a connection with the selected target device via the communication interface using the estimated shape information, the estimated distance, and the received advertisement information.

2. The terminal of claim 1, wherein the one or more trained machine learning models is trained to associate images of target devices with corresponding shape information.

3. The terminal of claim 1, wherein the one or more processors are further configured to:
when the estimated shape information of the selected target device matches shape information, included in the received advertisement information, of a first target device and a second target device of the plurality of target devices, obtain a first distance from the first target device based on a strength of a first signal received from the first target device and obtain a second distance from the second target device based on a strength of a second signal received from the second target device; and
identify the first target device or the second target device as the selected target device for establishing the connection based on the first distance or the second distance being closer to the estimated distance from the selected target device.

4. The terminal of claim 3, wherein:
advertisement information received from the first target device comprises transmission power of the first target device;
advertisement information received from the second target device further comprises transmission power of the second target device; and
wherein the one or more processors are further configured to:

obtain the first distance based on the first transmission power and the strength of the first signal received from the first target device; and obtain the second distance based on the second transmission power and the strength of the second signal received from the second target device.

5. The terminal of claim 1, wherein:

advertisement information received from the selected target device includes shape information and model information of the selected target device; and the one or more processors are further configured to obtain detailed information of the selected target device from a detailed information list including detailed information of the plurality of target devices, wherein the detailed information is obtained based on the shape information and model information of the selected target device.

6. The terminal of claim 5, wherein the one or more processors are further configured to obtain information on a communication protocol and a provided service of the selected target device via the obtained detailed information of the selected target device.

7. The terminal of claim 1, wherein the short-range wireless protocol is BLUETOOTH low energy (BLE).

8. A method of establishing a connection at a terminal using a short-range wireless protocol, the method comprising:

receiving, at the terminal, advertisement information including shape information and distance information from a plurality of target devices;

photographing a selected target device of the plurality of target devices;

inputting a photographed image of the selected target device to one or more trained machine learning models to obtain estimated shape information of the selected target device;

obtaining an estimated distance from the selected target device based on the photographed image; and establishing a connection with the selected target device using the estimated shape information, the estimated distance, and the received advertisement information.

9. The method of claim 8, wherein the one or more trained machine learning models is trained to associate images of target devices with corresponding shape information.

10. The method of claim 8, further comprising:

when the estimated shape information of the selected target device matches shape information, included in the received advertisement information, of a first target device and a second target device of the plurality of target devices, obtaining a first distance from the first target device based on a strength of a first signal received from the first target device and obtaining a second distance from the second target device based on a strength of a second signal received from the second target device; and identify the first target device or the second target device as the selected target device for establishing the connection based on the first distance or the second distance being closer to the estimated distance from the selected target device.

11. The method of claim 10, wherein:

advertisement information received from the first target device comprises transmission power of the first target device;

advertisement information received from the second target device further comprises transmission power of the second target device; and the method further comprises:

obtaining the first distance based on the first transmission power and the strength of the first signal received from the first target device; and obtaining the second distance based on the second transmission power and the strength of the second signal received from the second target device.

12. The method of claim 8, wherein:

advertisement information received from the selected target device includes shape information and model information of the selected target device; and the method further comprises obtaining detailed information of the selected target device from a detailed information list including detailed information of the plurality of target devices, wherein the detailed information is obtained based on the shape information and model information of the selected target device.

13. The method of claim 12, further comprising obtaining information on a communication protocol and a provided service of the selected target device via the obtained detailed information of the selected target device.

14. The method of claim 8, wherein the short-range wireless protocol is BLUETOOTH low energy (BLE).

* * * * *